US012506756B2

(12) United States Patent
Khan

(10) Patent No.: US 12,506,756 B2
(45) Date of Patent: Dec. 23, 2025

(54) SYSTEM AND METHOD FOR DETERMINING IF A SENDER'S EMAIL IS BEING EAVESDROPPED ON

(71) Applicant: Zafar Khan, Redondo Beach, CA (US)

(72) Inventor: Zafar Khan, Redondo Beach, CA (US)

(*) Notice: Subject to any disclaimer, the term of this patent is extended or adjusted under 35 U.S.C. 154(b) by 223 days.

(21) Appl. No.: 18/124,419

(22) Filed: Mar. 21, 2023

(65) Prior Publication Data

US 2023/0412625 A1    Dec. 21, 2023

Related U.S. Application Data

(60) Provisional application No. 63/366,661, filed on Jun. 20, 2022.

(51) Int. Cl.
*H04L 9/40* (2022.01)

(52) U.S. Cl.
CPC ...... *H04L 63/1425* (2013.01); *H04L 63/1475* (2013.01)

(58) Field of Classification Search
CPC ............. H04L 63/1425; H04L 63/1475; H04L 63/1483
See application file for complete search history.

(56) References Cited

U.S. PATENT DOCUMENTS

| | | | | |
|---|---|---|---|---|
| 2012/0072500 A1* | 3/2012 | Greene | ............ | G06F 16/23 709/206 |
| 2013/0298238 A1* | 11/2013 | Shah | ............ | G06F 21/554 726/23 |
| 2013/0305044 A1* | 11/2013 | Gutt | ............ | H04L 63/0428 713/160 |
| 2014/0278978 A1* | 9/2014 | O'Connor | ............ | G06Q 30/0255 705/14.53 |
| 2021/0314269 A1* | 10/2021 | Stewart | ............ | H04L 63/1425 |
| 2022/0060498 A1* | 2/2022 | Head, Jr. | ............ | H04L 12/4641 |
| 2022/0368662 A1 | 11/2022 | Tomkow | | |
| 2023/0306015 A1* | 9/2023 | Shughrue | ............ | G06F 16/2365 |
| 2023/0308472 A1* | 9/2023 | Boyer | ............ | G06F 40/40 |
| 2023/0344866 A1* | 10/2023 | Shao | ............ | H04L 63/1416 |

FOREIGN PATENT DOCUMENTS

IT     202000005746 A1 *  3/2020   ............ G06F 16/955

OTHER PUBLICATIONS

English language translation of Italian Patent IT-202000005746-A1 (13 pages) (Year: 2020).*

* cited by examiner

*Primary Examiner* — Thomas A Gyorfi
(74) *Attorney, Agent, or Firm* — Schlee IP International, PC; Alexander R. Schlee; Pascal A. Schlee

(57) ABSTRACT

A system and method and analyzer for determining if HTTP requests generated by user interaction with an email is an activity of an intended recipient. At least one link is added into an email sent by a sender, wherein the link automatically extracts data associated with the link when the email is opened at a recipient. A server receives receive HTTP requests at an internet address when a received email is opened at the recipient. Opening the email at the recipient automatically activates the link that is configured to automatically extract data associated with the link. An analyzer makes a determination, as to whether the data returned associated with the HTTP request include indicators that the HTTP request was not initiated by the intended recipient.

20 Claims, 14 Drawing Sheets

Daily Aggregate Domain Security Report
Active Threat Hunting Analytics: 01/09/2023

| Domain: rpost.com |
|---|

405 — Highest Risk Level: Yellow

410 — Activities Analyzed: 197

415 — Locations Analyzed: 98

| 425 — Risk Analysis: Percent of Total | Current Period | Previous Period | Delta |
|---|---|---|---|
| Green | 94% | 80% | +14% |
| Yellow | 6% | 20% | -14% |
| Red | 0% | 0% | 0% |

| 430 — Sending Statistics | Current Period | Previous Period | Delta |
|---|---|---|---|
| Unique Originators | 17 | 4 | +13 |
| Aggregate Recipients | 78 | 4 | +74 |
| Total Activities Analyzed | 197 | 5 | +192 |
| Total Unique Internet Locations | 98 | 5 | +93 |
| Time to First Activity (Median) | 1hour | 7hours1min | -6hours |
| Geographic Regions with Activities | 8 | 2 | +6 |

| 435 — Primary Features: Percent of Total Encrypted | Current Period | Previous Period | Delta |
|---|---|---|---|
| Certified E-Delivery Proof | 19% | 7% | +12% |
| Electronic Signature | 0% | 0% | 0% |
| File Share | 0% | 0% | 0% |

*"Time to First Activity" includes only those messages sent in the period with an activity in the period.
*"Highest Risk Level Map" displays the location that had the majority of the highest risk activities.
Total Potential Geographic Regions is 23..

FIG. 4

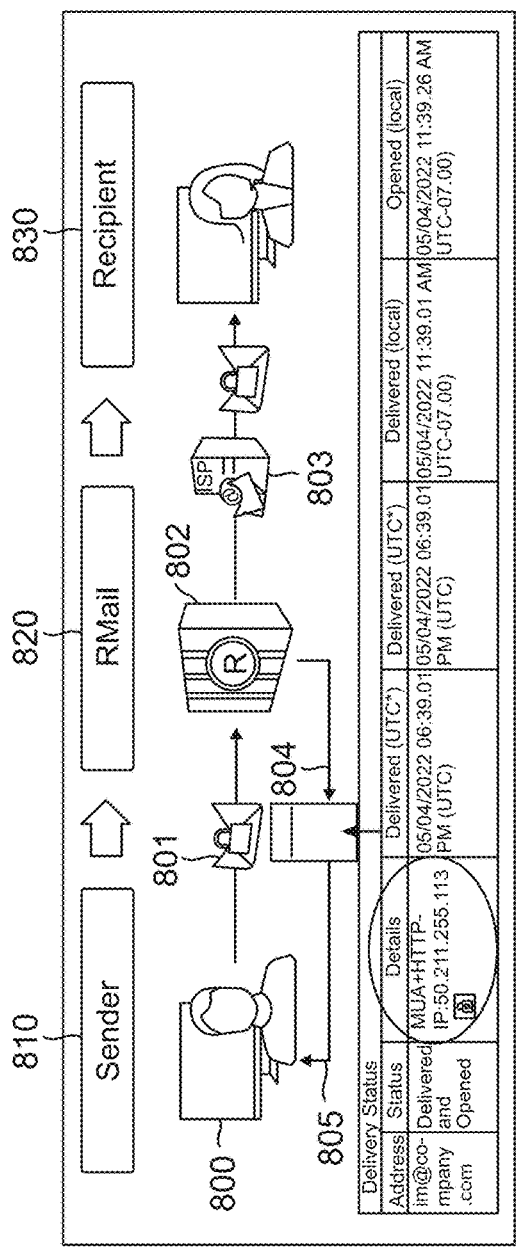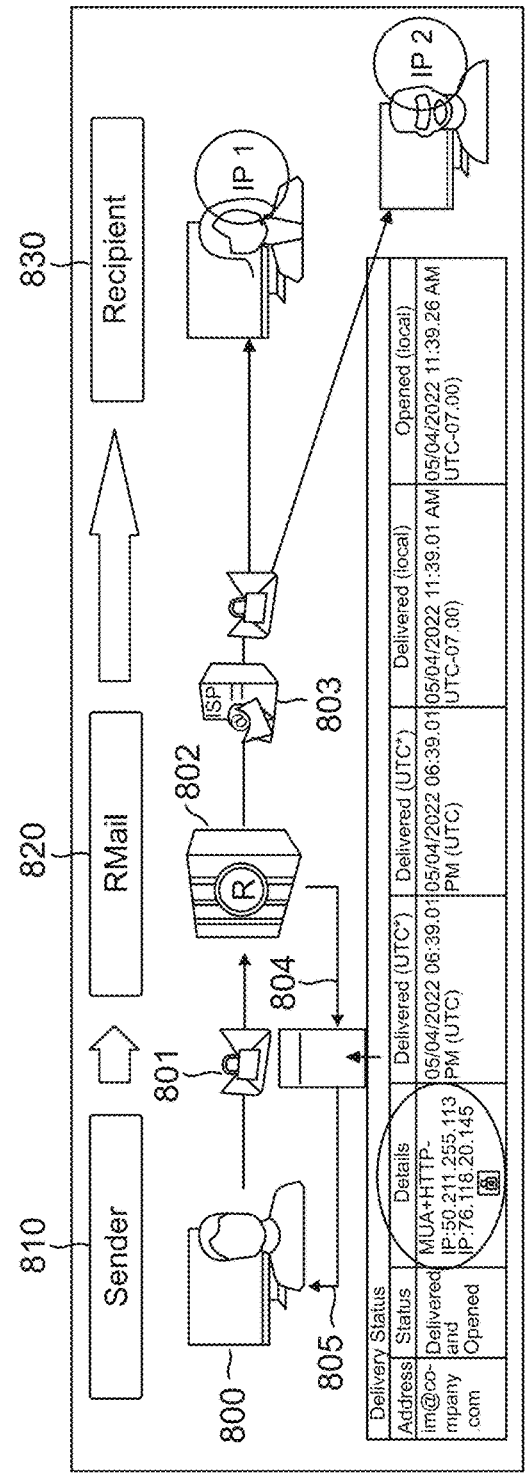
FIG. 8A
FIG. 8B

Risk Zones

Select Green (home region) and Red (high risk) Zones. All other Countries are Yellow.

Yellow

Search...

- ☐ Africa
- ☐ Asia
- ☐ Europe
- ☐ North America
- ☐ South America
- ☐ Oceania

Green

Search...

- ☐ Africa
- ☐ Asia
- ☐ Europe
- ☐ North America
- ☐ South America

Red

Search...

FIG. 9

Receipt <receipt@r1.rpost.net>
To bob@mail.com

| DeliveryReceipt.xml | ∨ | HtmlReceipt.htm | ∨ |
| 3KB | | 32KB | |

® OPEN RECEIPT
CERTIFIED RECORD OF OPENING

The following message has been delivered and opened for reading:

| Categories | Message Details |
|---|---|
| Message Subject: | Important Email |
| To: | mike@mail.com |
| Time Sent: | 03/24/2022 05:30:59 PM (UTC). 03/24/2022 10:30:59 AM (UTC -07:00) (Local) |
| Time Opened: | 04/14/2022 03:53:25 PM (UTC). 04/14/2022 09:53:25 AM (UTC -07:00) (Local) |
| Tracking Number: | 285A1918BFC9B979461F8D22188820778855DFC77 |
| Network ID: | <462D888F78C1B76587247D0A62D3010E2E202BF@SM21> |
| Client Code: | |
| 1010 — Open detection IP | 76.118.20.145 |
| 1020 — Security Level | Green (learn more) |
| 1030 — Open detection reporting | Cancel open detection for this recipient  Click Here |
| | Cancel open detection for this email  Click Here |

Details:
[IP Address: 192.168.10.186] [Time Opened: 4/14/2022 3:53:25 PM] [REMOTE_HOST: 192.168.10.186] [HTTP_HOST:open.r1.rpost.net] [SCRIPT_NAME=/open/images/Jy5b72CAH69yMH48KmNKNBlmVrhimqdbKmKWx0o7.gif] HTTP_ACCEPT:text/html_84 Safari/537.36 200.123.141.23

To authenticate this receipt, forward a copy with all attachment to "Verify@r1.rpost.net"

For more information about Email services visit www.mail.com    An Rpost Technology

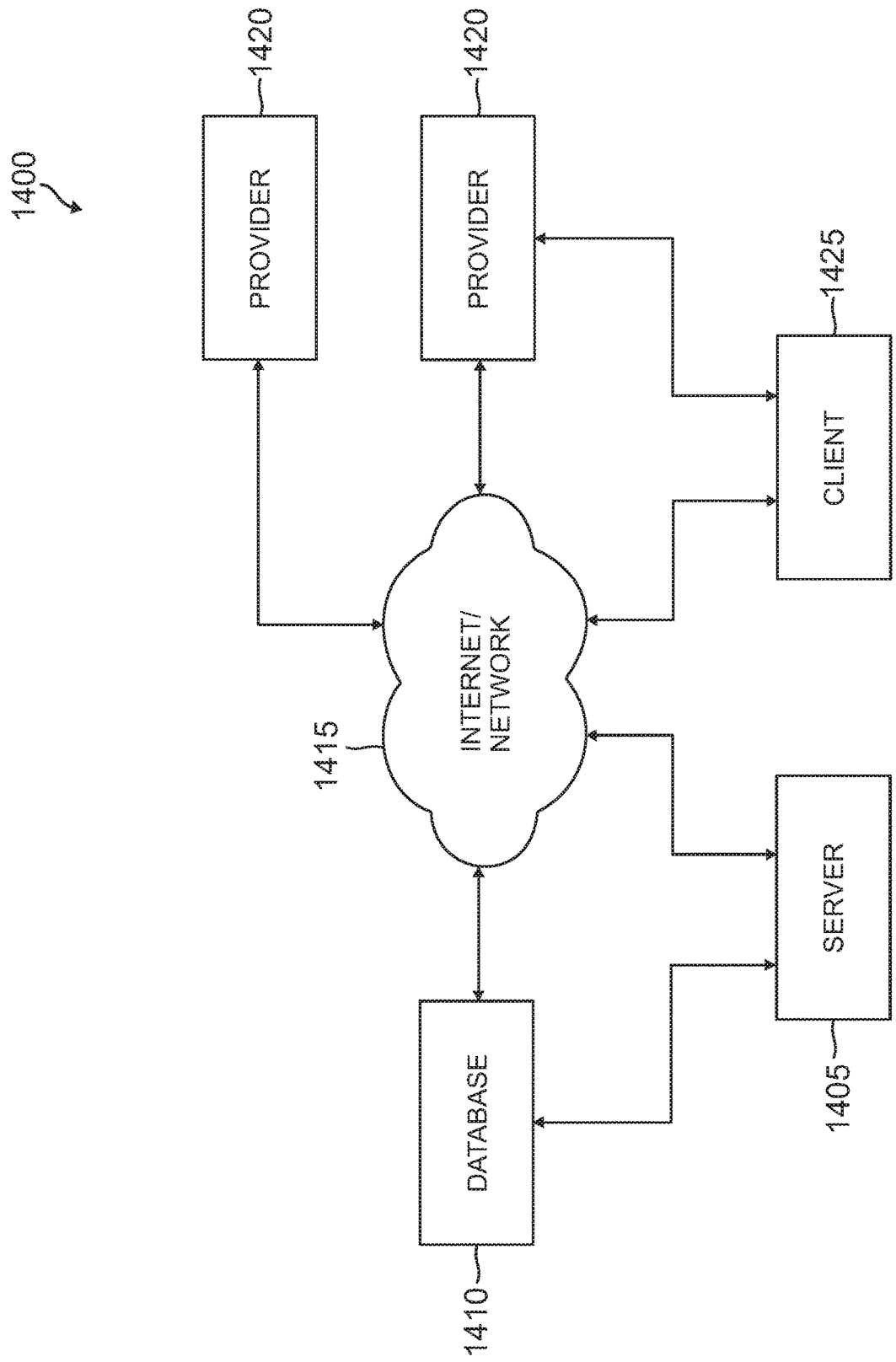

SYSTEM AND METHOD FOR DETERMINING IF A SENDER'S EMAIL IS BEING EAVESDROPPED ON

CROSS-REFERENCE TO RELATED APPLICATIONS

This application claims the benefit of the U.S. provisional patent application 63/366,685 filed on Jun. 20, 2022.

BACKGROUND

This invention relates to the field of reducing the risk of wire fraud, specifically by providing a sender of an email with automated feedback about a likelihood that an email sent to an intended recipient is eavesdropped on by one or more unauthorized and unintended recipients such as cybercriminals.

As our communications have become predominantly digital, cybercriminals continue attempting to capitalize on opportunities for fraudulent activity. Cybercriminals have employed increasingly sophisticated schemes to trick email users into sending them money. The Federal Bureau of Investigation (FBI) reported between June 2016 until July 2019, business email compromise (BEC) and email account compromise (EAC) reached more than $43 billion in attempts globally. Actual losses attributed to cybercriminals tricking business into misdirecting funds was reported to be $2.4 million, with a great deal more likely going unnoticed or unreported.

One systematic approach cybercriminals have employed to trick company staff into sending money to the cybercriminal is as follows: First, the cybercriminal eavesdrops on email stored in or sent to an email box of a recipient receiving a sender's message (using a variety of techniques such as accessing a recipient email account at the server level and causing a copy all email to be undetectably routed to the cybercriminal e-mail account). Second, the cybercriminal monitors the email received coming from the sender and received by the recipient in search of identifying information about a soon to be completed transaction (a product or service purchase from the sender by the recipient for example) such that a recipient would naturally pay an invoice to the sender based on the information received from the sender, and at that time of receipt of an invoice at the recipient from the sender. Third, when the cybercriminal identifies the right opportunity, they may create a lookalike domain (e.g. a domain with one character different) of the sender domain, copy the content of one of the emails, and make subtle changes to the content in furtherance of their scheme. Fourth, as an impostor of the original sender, the cybercriminal modifies the invoice or payment instruction document or email content associated with the abovementioned copied email. Fifth, the cybercriminal sends the modified email with modified payment details from the lookalike domain of the original sender to the recipient. Finally, the recipient often forwards this impostor invoice on to accounts payable staff, and the impostor invoice is paid.

This common scam relies on the email sender and/or recipient being unaware that the email exchange is being eavesdropped on by cybercriminals. These cybercriminals are typically located abroad, commonly in countries such as China, Nigeria, and Russia, with certain countries known to have greater rates of cybercriminality origination than others.

Furthermore, it is not uncommon for scammers to use virtual private networks (VPNs) to disguise their online identity, anonymizing information relating to, e.g. their originating geolocation. This has further served to frustrate efforts at detecting when an eavesdropper has intercepted an email sent to an intended recipient.

While technology exists to identify potentially fraudulent emails received by a recipient of and email (e.g. spam/junk folders), there is a shortcoming in the art regarding the identification of potentially fraudulent emails that are a near duplicates of existing legitimate correspondence and therefore does not have the marketing, high risk link, or grammatical content elements commonly triggering inbound email filters to identify messages as spam/junk. For preventing the scam from being successful, it is advantageous to identify the potential risk at least by the time the eavesdropper begins to take tangible steps towards attempting to strike, such as engaging in activity or creating an event on a particular email, as opposed to simply monitoring or filtering content. In this way, the threat can be identified and avoided before the intended recipient has an opportunity to fall victim to the scam, for instance by acting on an impostor invoice with payment information such as banking information designed to be routed to the cybercriminal's account.

One of the methods (of many that are used) cybercriminals use to initiate the email fraud attempt is by using technology to create automated systems to guess or buy passwords associated with the web-client login of email accounts or to use phishing email with fake linked accounts where people enter passwords. Once the cybercriminal obtains access to the email account, the cybercriminal goes into the email settings for incoming email, and sets the inbox to automatically forward a copy of all incoming email to another email address (setting forward plus save a copy of forwarded email) that is monitored by the cybercriminal, since few email users use the web interface to send (most send from an email program on their phone or computer versus the web browser interface), or if they use the web interface, few explore or monitor settings changes. Therefore, the user of the email account often does not know that copies of their emails have been set to be forwarded. Another method is to use that acquired or determined password to make a connection to the email account using an IMAP protocol at the recipient email server level, thereby copying email to the cybercriminal device while leaving a copy on the recipient server.

Cybercriminals start by using this abovementioned or a variety of other tactics to eavesdrop (gain access to content in a recipient email account) and when they see the right opportunity, they strike. When the cybercriminal decides it is time to trick the eavesdropped upon email recipient, the cybercriminal purchases a domain similar to that of the email account they are monitoring, often with one letter off (Anchorinsurance.com vs Anchorinsurnance.com).

Once the cybercriminal starts to receive the copies of email at their account, when they see the right opportunity, they "select all" in the email, "copy" and paste the content into a new email, and write above the email (mimicking an email thread look) as if they are replying to an earlier email, the reply coming from the lookalike (impostor) email domain mimicking the original sender so that the original intended recipient starts to correspond with the impostor thinking it is the original sender. Essentially, the impostor hijacks the email dialog between the original sender and the original recipient.

Ultimately the cybercriminal acting with content from the recipient mailbox creates or modifies an invoice received in the past with subtle changes including different payment details and sends it from the lookalike domain to the recipient. Ultimately, the recipient may make a payment on a fake invoice or follows fake wire transfer coordinates.

There is a need in the art to identify activities on email (e.g. email opens) associated with a greater risk of cybercriminality and provide an alert to notify email senders and recipients in order to detect eavesdropping as a first step in a criminal scheme and therefore prevent this scheme from maturing into actual wire fraud due to misdirected funds. Likewise, it is important to prevent false alarms, which can undermine the perceived seriousness of an alert. Accordingly, it is necessary to ascertain factors indicative of fraudulent eavesdropping, and effectively evaluate these factors to accurately assess potential threats.

SUMMARY OF THE INVENTION

It is an object of the invention to provide a sender of an email with an automated evaluation of a likelihood that an email sent to an authorized recipient is eavesdropped on by one or more unauthorized recipients.

According to a first aspect of the invention, this and other objects are achieved by a system for determining if HTTP requests generated by user interaction with an email is an activity of an intended recipient, wherein a link is embedded in the email and configured to automatically extract, said system comprising: a link adding module configured to add at least one link into an email sent by a sender, wherein the link is configured to automatically extract data associated with the link when the email is opened at a recipient; and a web server, including: a processor programmed using hardware and/or software commands, wherein the processor is configured to receive HTTP requests at an internet address when a received email is opened at the recipient, said opening of the email automatically activating the link that is configured to automatically extract data associated with the link; at least one database comprising parameters related to email opens, and an analyzer configured to make a determination, based on said parameters, as to whether the data returned associated with the HTTP request include indicators that the HTTP request was not initiated by the intended recipient.

According to a second aspect of the invention, this and other objects are achieved by a method for determining if HTTP requests generated by user interaction with links or with links configured to automatically extract in an email is an activity of an intended recipient of the email, said method comprising: 1) adding a tracking link to a sent email; 2) recording an opening of the email by one or more devices via a tracking link server; 3) extracting and parsing HTTP data associated with the opening(s) of the email; 4) populating a database with the HTTP data, including at least the internet protocol (IP) address of the connection with the one or more devices opening the email; 5) analyzing geolocation data associated with the intended recipient and/or the one or more devices opening the email; and 6) performing a comparative analysis assessing risk of email interception.

According to a third aspect of the invention, this and other objects are achieved by an analyzer that is configured to: receive an HTTP request that is associated with an email message ID of an email opened at one or more devices opening the email; extract and parse received HTTP data associated with the HTTP request; populate a first database with the HTTP data, including from the HTTP data the internet protocol (IP) address of the connection with the one or more devices opening the email as a first information; access a second database or a subsection of the first database, that contains at least one of geolocation or network owner data associated with the internet protocol (IP) address or other information in the HTTP data in the first information, which is a second information; access a third database or an additional subsection of the first database that contains at least one of IP addresses, IP address ranges, network owner, or device user agent data that is flagged with a risk level indicative of email interception by at least one unauthorized third party, which is a third information; compare at least a portion of the first information with at least a portion of the third information, or compare at least a portion of the second information with the at least a portion of the third information to determine if at least a portion of the first or the second information matches the at least portion of the third information; and if at least a portion of the first information or second information matches the at least portion of the third information, generate a report with a risk indication that indicates that the one or more devices opening the email were not intended devices.

DETAILED DESCRIPTION OF THE INVENTION

In the following description, numerous specific details are set forth in order to provide a thorough understanding of the present disclosure. It will be apparent, however, to one of ordinary skill in the art, that the present disclosure may be practiced without these specific details. In other instances, well known components or methods have not been described in detail but rather in a block diagram, or a schematic, in order to avoid unnecessarily obscuring the present disclosure. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Throughout the description reference will be made to various software programs and hardware components that provide and carryout the features and functions of the various embodiments of the present disclosure. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the disclosure.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

This technology described herein provides reports to a sender (or sender administrator or the recipient of the email account compromised) about whether and when it should be suspected that one of the recipient email boxes that they are sending invoice or payment details to has been compromised or is being eavesdropped on by cybercriminals, hence identifying this type of attack for a sender, before it causes a loss. This technology described herein is designed to help companies catch compromised client mailboxes before the compromised (recipient) mailbox turns into an impostor email induced wire fraud success.

The technology herein describes a way to detect when a third party not associated with the original sender or recipient opens an email intended for the recipient and alerts the sender and/or sender administrator that a third party may have access to the recipient's email.

This technology describes how to generate electronic alerts and reports for the sender and/or the sender administrator (or even compromised recipient) that can provide indications that a recipient email box has been compromised or recipient email is being eavesdropped.

This technology described herein helps to identify instances when the recipient email box has been set, unknowingly to the recipient, to forward a copy of all received email at that email box to an email box monitored by the cybercriminal or the cybercriminal somehow obtains copies of email received at the recipient email account.

Generally, the present disclosure involves a system and method for determining if a sender's email is being eavesdropped on by a cybercriminal, and notifying the email sender and/or recipient(s) that the communication may have been compromised.

In one aspect of the invention, the disclosure describes a system for determining if HTTP requests generated by user interaction with links or with links configured to automatically extract in an email is an activity of an intended recipient of the email. The system is configured to add links into an email, wherein the links are configured to automatically extract when the email is opened by a recipient. Such opening of an email at the recipient can be made in various ways, not necessarily by the intended recipient, or at the intended recipient, but at a recipient, for example since the email was forwarded, or cybercriminal is copying all email via an IMAP connection or create a process to download all of a recipient's email. The opening at a recipient could therefore be described more broadly as an "activity" at a recipient (server), for example, a server programmed to extract all links in email. An example for such activity could serve the purpose of testing to see if links are associated with known websites that load malware. All these activities should be understood in the following as an opening of an email at a recipient.

The system includes web server capable of receiving HTTP requests at an internet address when the links are opened at a recipient. The web server may be coupled to a database containing parameters and an analyzer that uses those parameters to make a determination as to whether the data returned associated with the HTTP request includes indicators that the HTTP request was not initiated by the intended recipient.

In another aspect of the invention, the analyzer may be configured to further determine if there is an additional HTTP request record at a different location than a location that the sender of the email indicates is an expected location, and records the determination in a database associated with the analyzer.

The analyzer may be further configured to determine if there is an additional HTTP request record at a different country location from the declared home country or determined home country of the initial recipient and records the determination in a database associated with the analyzer.

The analyzer may be further configured to determine if there is an additional HTTP request record at a different country location from the home country of the sender and records the determination in a database associated with the analyzer.

The analyzer may be further configured to determine if there is an additional HTTP request record at a country location that is in a list of countries as a parameter at the analyzer and records the determination in a database associated with the analyzer.

The analyzer may be further configured to determine if there is an additional HTTP request record at an ISP or VPN provider IP range that is in a list of ISP or VPN provider IP ranges, or with recipient device information that is in a list of recipient device information, as a parameter at the analyzer and records the determination in a database associated with the analyzer.

The analyzer may perform any of the foregoing analyses severally or in any combination.

The output of the analyzer's result(s) of any of the foregoing analyses may be retained in a report. The report may contain an aggregate of the records for an associated group of senders and may be returned to an administrator associated with a sender. The report may be rendered tamper-detectable. The report may contain a portion of the HTTP record.

The report, based on report criteria, may be returned to the sender or a user associated with the intended initial recipient. Alternatively or in addition, the report, based on report criteria, may be returned to an administrator associated with the sender or an administrator specific to designated report criteria. Alternatively or in addition, the report, based on report criteria, may be returned to the receiver address associated with the original send.

This technology describes how to generate electronic alerts and reports for the sender and/or the sender administrator (or even compromised recipient) that can provide indications that a recipient email box has been compromised or recipient email is being eavesdropped. The report may be used as evidence of an email having been eavesdropped on and as such, contains at least portions of the data recorded from the HTTP connection and analyzer determinations, or data mapped from the HTTP connection data cross referenced with other data at the server. The report may additionally be digitally signed, encrypted, or have an encrypted hash or other identifier to render the content of the report authenticatable.

This technology described herein helps to identify instances when the recipient email box has been set, unknowingly to the recipient, to forward a copy of all received email at that email box to an email box monitored by the cybercriminal or the cybercriminal somehow obtains copies of email received at the recipient email account.

Before they see the right opportunity to strike, they may also be opening the "forwarded" copies of the original email sent from the sender to the real recipient (copy forwarded to the cybercriminal).

In both situations, if the email to the recipient that is forwarded and opened by the cybercriminal, or forwarded, copied, and pasted, if there is HTTP open tracking data that can be gathered from a linked image configured to automatically extract, embedded in the email by the sender or sender's server system and it extracts at the recipient, the server associated with the link can capture data about the device and location where the link was extracted.

HTTP data received when a recipient opens an email sent from a sender can be analyzed if that email has a link embedded in the email and this link is configured for tracking, e.g. the link configured to automatically display an image (or pixel-sized white image, etc.) when a recipient opens an email, the link configured to automatically call to the server associated with the link to return the image at that server to display in the email at the recipient; or the link when clicked by a recipient, configured to call to the server associated with the link to return the image at that server to display in the email at the recipient. In both scenarios, the server records HTTP data associated with the recipient that has clicked on the link or caused the link to automatically open by opening the mail displaying the image. These HTTP data include tracking information containing the IP address associated with the Internet connection of the device where the image sent from the server to the recipient is displayed along with device and device software (e.g. browser) information.

In addition to the foregoing configurations, the system can be configured so that different sender or user administrators receive different types of alerts depending on the determined likelihood that the activity in the report is one of an unauthorized third party.

Further, the system can be configured so that it operates on a REPLY to a sender using the system. This means, if a sender sends an email with the functionality, if the recipient replies and the email is routed back to the sender, that reply from the recipient to the sender can be inducted into the system to detect email eavesdropping even though that recipient is not enrolled as a user of the system.

The technology herein describes a way to detect when a third party not associated with the original sender or recipient opens an email intended for the recipient and alerts the sender and/or sender administrator that a third party may have access the recipient's email.

"International" herein refers to a country or region outside of the sender, or recipient's declared or determined home country or expected region.

BRIEF DESCRIPTION OF THE DRAWINGS

The drawings accompanying in forming part of the specification are included to depict certain aspects of the disclosure. A clear impression of the various embodiments of the disclosure, and of the components and operation of systems provided within the disclosure, will be more readily apparent by referring to the exemplary, and therefore nonlimiting, embodiments illustrated in the drawings, wherein identical reference numerals designate the same components.

FIG. 4 is an exemplary Daily Aggregate Domain Security Report generated by the process illustrated in FIG. 1, 2, 5-7, or 12.

FIGS. 8A and 8B are schematic diagrams detailing the comparison of Open Detection Report for a first detected open and for multiple opens, respectively.

FIG. 9 is a partial view of an exemplary interface for designation of risk zones.

FIG. 10 is an exemplary Open Receipt Report generated by the process illustrated in FIG. 1.

FIG. 14 is a schematic diagram of a network used in accordance with the various embodiments of the disclosure.

DETAILED DESCRIPTION OF THE PREFERRED EMBODIMENTS

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Detailed descriptions of known computer software, hardware, operating platforms, and protocols are omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
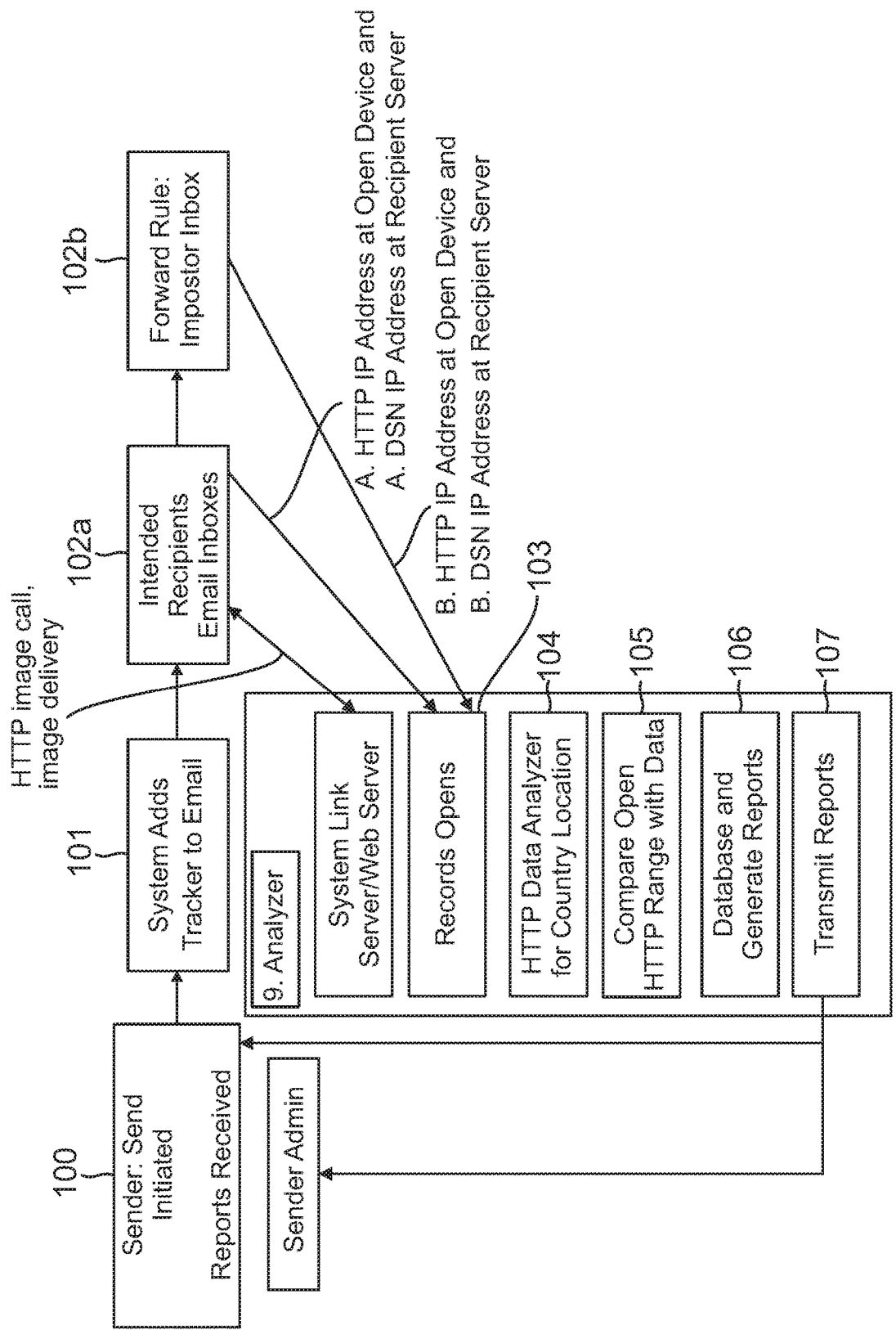
FIG. 1 is a flow chart illustrating an embodiment of the present disclosure, namely the parsing of HTTP data returned to the server at an email opening.

FIG. 1 illustrates an exemplary computer implemented method for parsing HTTP data returned to the server at opening of an email by the intended original recipient and by an impostor, the latter having for example an international IP address.

When an email is sent and detected to be open, a system operating for the sender can capture the HTTP data, which includes at least IP addresses where the email was opened. If an IP address corresponds to a different country than the designated home or declared safe country (or countries) of the sender, the system may be configured to generate and transmit a report to the sender or sender administrator alerting them that the email may have been hijacked or opened by someone other than the sender's intended recipient.

In this case, an "analyzer" parses the text content of the HTTP data record returned to the system server operating on behalf of the sender. Upon finding indicators in the HTTP data record text related to IP-address, identifies the geo location (e.g. country) associated with the IP addresses (by submitting the IP address into an IP geolocation database for example, and stores the indication as to whether opening has been detected in different geographic IP locations from those identified as associated with the sender's designated safe or home geographies, within a parameter timeframe.

Then the analyzer makes the determination of whether the open detections can be relied upon by the system as opened by the sender's intended recipient or by a cybercriminal that is monitoring the recipient's email account.

Ultimately, the goal of the technology is to determine if an unintended third party has opened the recipient email, and reporting such email open to at least one of the: (i) sender, (ii) sender administrator, and (iii) recipient. This can then be used as an indication or indications to determine if a copy of the message was forwarded to a second system via an auto-forwarding rule, which can be an indication of receiver email account hijacking.

The steps of the system could additionally use technology described in application Ser. No. 17/663,425 Entitled, "IDENTIFYING HTTP REQUESTS GENERATED FROM LINKS EMBEDDED IN EMAILS BY AUTOMATED PROCESSES", hereby incorporated by reference herein in its entirety, and summarized below in more detail.

In step 101 the system automatically adds the tracking link to sender email. One way this can occur is at the click of the send button connecting via an API to the link tracking server to generate a unique link associated with the message and embed that link in the message at the sender or sender server before the message sends. Alternatively, the message could be directed to route outbound through a service that adjusts the message content by adding such tracking link.

In step 102a, an original intended recipient—or in step 102b any subsequent recipients to which the email is forwarded—receives and opens the email. This causes the tracking link server to record the opening of the email.

In step 103, the tracking link server records HTTP data associated with each opening or activity record and builds a database related to all the tracking details associated with each open detection for each sent message. The database comprises at least one of: (1) the IP address of the connection with the device opening the email which is parsed from the HTTP open tracking data, and (2) the IP address of the sender, which may be parsed from the HTTP open tracking data or may be stored data. The IP address of the sender can be detected by: extracting IP address information from the server upon delivery of messages, or by sending a test email to the sender for the sender to activate the link in the mail or click on a link/image to activate this feature. This sender IP address could be used to programmatically determine the sender's "home" country or geolocation region.

In step 104, the Analyzer determines countries associated with IP addresses or ranges.

In step 105, the Analyzer additionally compares the HTTP open data captured IP addresses at each opening with an IP address geolocation table or system and records the geographic location of each open or activity.

In step 106, the Analyzer results are added to the database, compiling at least: a) the country associated with a recipient's open determined based on the IP address of the HTTP open detection, and b) the sender country or sender safe country either as declared by the sender or determined based on the IP address range of the HTTP open detection. The Analyzer proceeds to perform a comparative analysis for each message sent. First, based on IP addresses or sender declarations, the Analyzer compares whether the recipient country differs from the sender country or the sender's declared home or safe geolocations for correspondence with that intended recipient. If the locations differ, the Analyzer outputs a report noting "International Activity (Based on Sender Location)". Second, the Analyzer compares where there are two openings associated with the same recipient email, and whether the openings occurred in different countries from one another. If the openings occurred in different countries, the Analyzer outputs a report noting "International Activity (Based on Recipient Location)". Third, the Analyzer generates a report for transmittal to the sender and/or sender administrator, wherein the report indicates a risk factor associated with each recipient of the message. If no international activity is identified, the report may note risk level is "Normal". If international activity is identified, the report may note "Potential Risk".

In step 107, the report is transmitted to at least one of the: (i) sender, (ii) sender administrator. In a preferred embodiment, the report may in a known manner be rendered authenticatable, which improves its evidential value. Additionally or alternatively, the original message content and uniform timestamps of sending, delivery, and/or opening may be cryptographically associated with the report of the message. In another preferred embodiment, the report includes transmission metadata or HTTP logs associated with the email open activity. The analyzer may be further configured to generate and transmit supplemental alerts if a message initially categorized as "normal" is subsequently flagged as "international activity". Finally, if a given email has multiple recipients, the report outputs may be compiled in a table to readily identify the risk for each recipient of each sent email. This step may also be advantageous for a sent email that is of high value, sensitive in nature, encrypted, or otherwise falling under a designated classification of email.

In another embodiment, the Analyzer performs its functions on at least one of: (i) links embedded in documents, (ii) other methods of tracking where a rights-protected document or email attachment is opened, or (iii) where an HTML document or page is viewed, or (iv) a download link is clicked. This embodiment builds on the system described in USPTO patent application 63/363,014, hereby incorporated by reference herein in its entirety.

Figure 2:
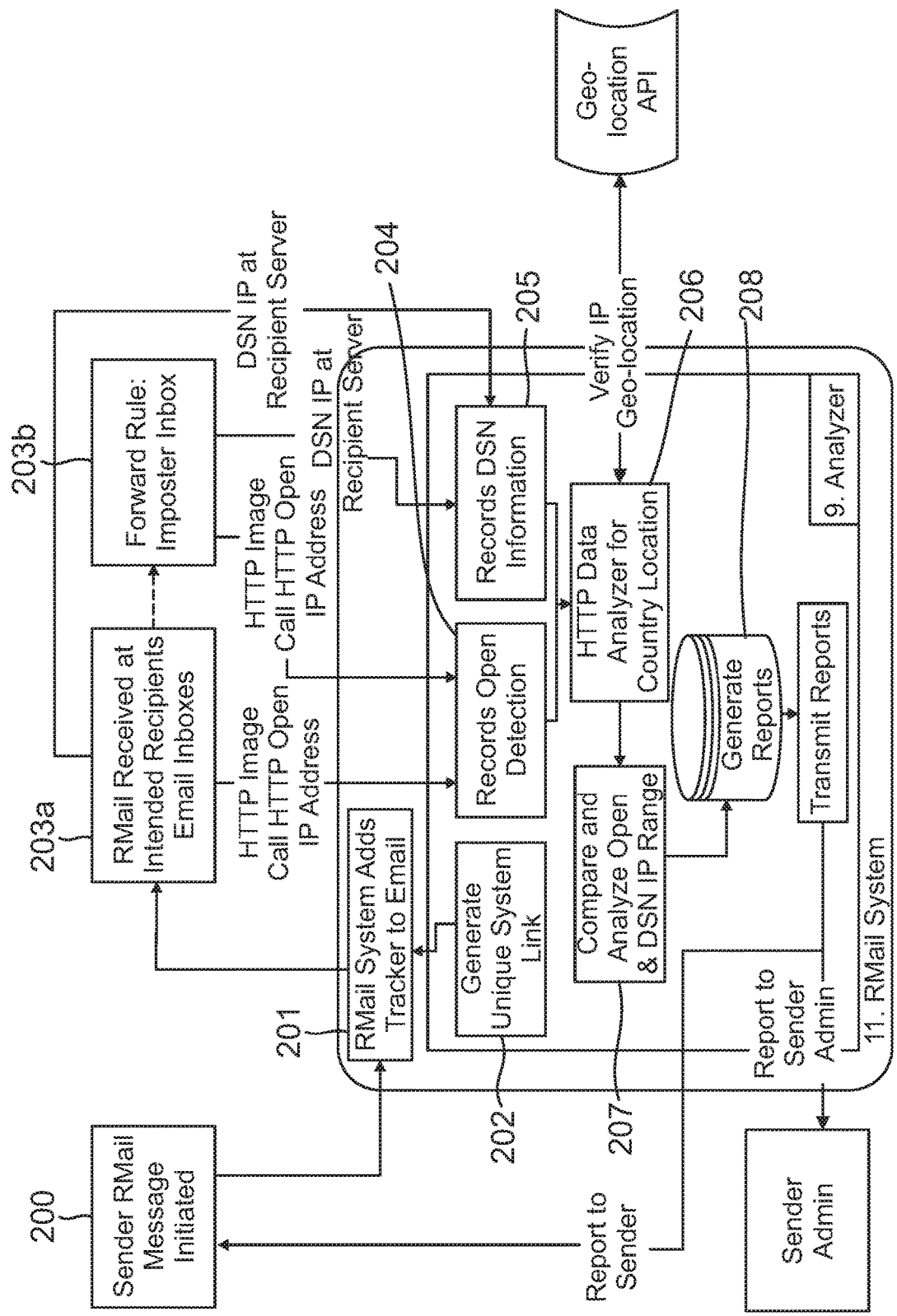
FIG. 2 is a flow chart with schematic block elements illustrating an embodiment of the present invention, namely the parsing of HTTP data returned to the server at the opening, specifically from an international IP address.

FIG. 2 demonstrates a system and method according to the invention, illustrating parsing of HTTP data returned to the server at the opening, specifically from an international IP address.

In step 200, the process begins with the sender initiating or a system routing the sending of a message designated to have the service of the RMail system. The RMail system is the system that operates this technology.

In step 201, the system inducts the message and automatically adds the tracking link or links to the sender email at the sender, at the sender server, or at an intermediate server separate from the sender and separate from the recipient. Optionally, the system adds a header to the email configured to direct DSNs to a system email address. This can be accomplished by, at the click of the send button, connecting via an API to the link tracking server to generate a unique link associated with the message and embed that link in the message before the message sends. Alternatively, the message could be directed to route outbound through a service that adjusts the message content by adding such tracking link.

In step 202, during the process of adding the tracker link to the email, the system obtains the tracker link by generating a unique link associated with the message and an image, that link embedded in the email and configured to automatically extract upon opening of the message, the extract calls to a server to deliver the image to the message at the device where the message has been opened.

In step 203*a*, the recipient—or according to step 203*b* any subsequent recipients to which the email is forwarded— receives and opens the email. This causes the tracking link server to record the opening.

In step 204, the tracking link server records HTTP data associated with each opening and builds a database related to all the tracking details associated with each open detection for each sent message. The database comprises at least one of the following parsed from the HTTP open tracking data: (1) the IP address of the connection with the device opening the email, and (2) the IP address of the sender or sender designated "home" or safe geolocations. The IP address of the sender can be detected by extracting IP address information from the server upon delivery of messages or by sending a test email to the sender for the sender to activate the link in the mail or click on a link/image to activate this feature, or the sender may declare designated "home" or safe geolocations.

In step 205, the IP information is received and analyzed within the DSN at the system server, and a database is built relating to all the tracking details associated with each delivery notice detection for each sent message. This database includes at least the IP address of the connection with the server or device receiving or acting on the email. This IP address is parsed from the DSN data.

In step 206, the HTTP information from the HTTP open tracking and DSN received by the system via re-routing are analyzed to determine country location. The Analyzer identifies countries associated with the sender and countries associated with (i) each recipient open and/or (ii) each recorded (DSN) delivery. The Analyzer compares the IP data captured at each opening and delivery with an IP address geolocation table or system and records the geographic location. The IP address geolocation table may also be populated using an API connection to an external table.

In step 207, the system performs a comparison of the determined country of recipient IP address and the sender's designated "home" country/countries, and additionally compares them against designated high-risk countries. This comparison function considers (1) the recipient country where the open click was done, based on HTTP open detection IP address, (2) the delivery recipient country based on DSN delivery IP address, and/or (3) the sender country based on HTTP open detection IP address or IP range, or a country otherwise declared by the sender. The comparative analysis performed by the Analyzer for each message sent includes the steps of: (a) comparing whether, based on the IP addresses or sender declarations, the sender country is different from the recipient country or declared safe or risk locations, and/or (b) comparing whether there are two openings associated with the same recipient email address, where the openings occurred in different countries from each other, and/or whether the countries are declared safe or risk locations.

In step 208, for each message sent the Analyzer generates a report for the sender and/or sender administrator indicating a risk factor associated with the message sent to each recipient, either (a) Normal (if no International Activity is identified), or (b) International Activity (if a potential risk is identified). If the sender country is determined to be different from the recipient country, the Analyzer outputs a report noting "International Activity (Based on Sender Location)" or "International Activity (Based on Declared Home Countries" or other notices. If two or more openings associated with the same recipient email address are determined to have occurred in different countries from each other, the Analyzer outputs a report noting "International Activity (Based on Recipient Location)" for example.

In step 209, the reports generated by the Analyzer may be transmitted to at least one of: the sender and sender administrator.

The analyzer may be further configured to generate and transmit supplemental alerts if a message initially categorized as "normal" is subsequently flagged as "international activity". Finally, if a given email has multiple recipients, the report outputs may be compiled in a table to readily identify the risk for each recipient of each sent email. This step may also be advantageous for a sent email that is of high value, sensitive in nature, encrypted, or otherwise falling under a designated classification of email.

In another embodiment, the Analyzer performs its functions on at least one of: (i) links embedded in documents, (ii) other methods of tracking where a rights-protected document or email attachment is opened, or (iii) where an HTML document or page is viewed, or (iv) a download link is clicked. This embodiment builds on the system described in USPTO patent application 63/363,014, hereby incorporated by reference herein in its entirety.

Figure 3:
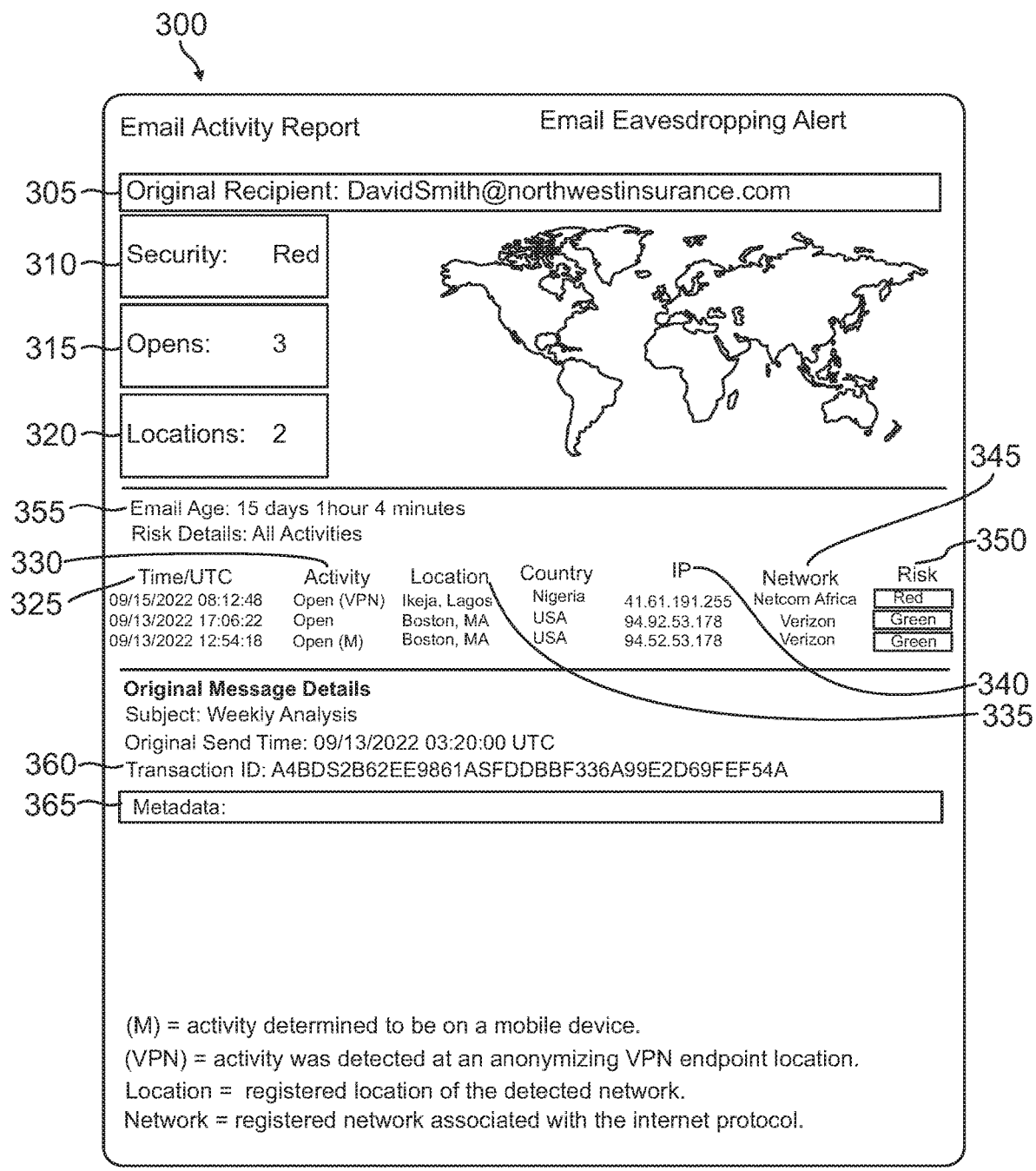
FIG. 3 is an exemplary Email Activity Report generated by the process illustrated in FIG. 1, 2, 5-7, or 12.

FIG. 3 shows an exemplary Email Activity Report 300 as it is for example generated by the process illustrated in FIG. 1, 2, 5-7, or 12.

The reports generated by the described methods may be returned in a variety of manners, including via email, a web portal, or in a receipt. Alternatively, it may be appended to a receipt as a digitally signed PDF report having a receipt message ID. Alternatively, it may be transmitted as a windows tray or desktop alert. Yet another alternative is for the report to be dynamically updated in a web table or in an update view associated with the sent item. Regardless of the form in which the report is transmitted, it is advantageous for the report to be presented as a table including the following fields for each recipient address:

Delivery Status 315, identifying how many unique activities were detected associated with that message to the original recipient 305.

Activity classification 310, namely whether the activity related to the email based on locations or methods on how recipients acted on that email was (a) normal, or (b) high risk.

Location classification 320, namely how many activities were caused at how many unique locations.

Email age information 355, the age of the email at the time the report was generated; risk and message analysis details for each activity 325 on the particular message with transaction ID 360, including the type of activity 330 that occurred on the message at each location 335 with each network IP address of the location 340 and network provider name 345 and the determined risk level of that activity 350, with metadata 365 associated with these activities or the latest activity to include portions of the message transport dialog and raw HTTP and DSN data.

Certain activity detection parameters may not be useful for purposes of detecting email eavesdropping, and therefore it may be advantageous to perform additional analysis to minimize extraneous/false alerts, for instance by automated system openings by security filters. Certain activity detection parameters may be useful additional indicators or detecting email eavesdropping and may override location related data. Exemplary relevant parameters to consider in this additional analysis include, for example:

(M)=activity determined to be on a mobile device
(CDN)=content delivery network delivered email data to viewer. This is an example of information that may override location related risk data and be a determination of lower risk.
(VPN)=activity was detected at an anonymizing VPN endpoint location. This is an example of information that may override location related risk data and be a determination of high risk.
Location=registered location of the detected network.
Network=registered network associated with the internet protocol.

These parameters may be used individually or in any combination for the computation of risk scores. Different risk scores may be factored based on this data, for example, an international location detected via a content delivery network (CDN) may be scored lower risk, and home location detected via a VPN anonymizer IP address may be scored higher risk.

To determine activity accessing the email via a VPN anonymizer, the analyzer may parse the data through additional databases as noted in FIG. 2, Step 206, those specializing on VPN related IP addresses versus geolocation.

To determine activity accessing the email via a Content Delivery Network, browser or device information, or other data, the analyzer may parse the data through additional databases as noted in FIG. 2, Step 206, those specializing on lists of Networks or IP address ranges known to be Content Delivery network addresses versus geolocation, or those specializing in interpreting device and/or browser HTTP information.

Additional adjustments may need to be made to suppress reporting on repeat openings in the same location within a parameter period of time and may need to be adjusted to suppress activities recorded within a specified time from the time of original sending.

Some further parameters that may be considered in the analysis include:

(S)=activity determined to be caused by a server
(E)=activity determined to be an expert user
(M)=activity determined to be related to nefarious behavior of masking data
(B)=activity determined to be related to automation scripts or bots Parameters (S), (E), (B), and (M) each draw from user agent data to identify attributes that may be associated with a higher risk level. The (S) parameter may denote when certain high-risk servers are associated with the activity, for example adding the notation when a user agent contains "apache". The (E) parameter may denote when software associated with expert technology users is detected, for example when a user agent contains "ubuntu", "baidu", or "Vivaldi". In addition to the notation, the risk level may be elevated to "yellow" unless already "yellow" or "red". The (M) parameter may denote when activity related to nefarious behavior of masking data is detected, for instance when a user agent contains "meterpreter", and may automatically classify the activity as a "red" risk level. The (B) parameter may denote activity associated with automation scripts, for example when a user agent contains "script". Furthermore, when a user agent contains commands or closely associated with cybercrime, for example "nikto" or "dirb", the risk level may be elevated to "yellow" unless already classified as "yellow" or "red".

The email activity report 300 may include the email address of the original recipient 305, which is not the address for which every reply, forward, delivery or opening of the message or parts of the message thread may have occurred, but rather it is the original recipient for the original message send. The report 300 may prominently display a determined risk level 310 based on the most recent activity geolocation in relation to the original sender's actual home location or declared safe regions. In addition, the report may detail the total number of activities and unique locations where activities of been detected since the original email transmission. Furthermore, the report may list the Email Age 355, noting the time lapsed since the original email transmission, for example in the form of days, hours, and minutes.

A table may be included detailing information on message opens, including time 325, activity 330, location and country 335, network address 340, network 345, and risk level 350. This allows for an easy audit of the exact date and time an activity occurred, what the activity was (e.g. delivery or opening of an email), and the location (e.g. city, state, country) the activity occurred at based on the network IP address of the activity, as well as the network name. Based on this information, each activity includes a risk level categorization to put a sender on alert that their email communication may have been compromised. Additional insights into the activity can be considered when assigning a risk level, for instance if the email was open using a mobile device or personal computer or whether an anonymizing VPN was used. In embodiments where risk analysis considers more than one parameter, the report 300 may also include an additional "Reason" column (not shown), indicating to users why certain activity was classified as "green", "yellow", or "red". For example, the "Reason" column may state that an activity was marked as green because of the IP address range, but not because of the location.

A transaction ID 360 may be assigned to the activity report in order to tie together multiple notices associated with the same original email sent to the original recipient. Transaction metadata 365 may also be included to provide a user or IP administrator insights to perform further analysis.

A report may be generated for each recipient email address when international activity is detected. Activity Details may provide further information about the international activity detection, for instance listing country or countries (i) other than sender home country, (ii) if more than one recipient country, and/or (iii) if at least one recipient country is not equal to sender country. An email alert may be configured based on the appropriate activity type.

As shown in FIG. 4, a Daily Aggregate Domain Security Report 400 may be generated to provide an aggregate activity report for all sent emails across the entire noted sender domain. This can include outputs identifying the highest risk level 405 across all messages sent from the sender domain during the report period, the total number of unique locations analyzed 410 across all messages sent from the sender domain during the report period, and the total numbers of activities tracked in those locations 415 across all messages sent from the sender domain during the report period. The highest risk level may be determined by comparing all activities across all messages sent from the sender domain during the report period based on activity geolocation vis a vis the original aggregate of each sender's actual home location or declared safe regions or other risk determining criteria including for example, activities from VPN anonymizers. The Report 400 may further include a Threat Map 420 highlighting and/or pinpointing on a world map, the location at which the highest risk level email open or activity was identified.

Furthermore, the Report 400 may include a Risk Analysis Table 425, comprising a tabulated breakdown of the number or percentage of messages assessed to have the respective risk levels, for instance "Green", "Yellow", and "Red". These statistics may be compared with those for a previous period, and "Delta" may be displayed detailing comparative risk level trends.

This Report 400 may additionally include a Sending Statistics Table 430, comprising a tabulation of sending statistics for the following categories: number of unique centers, aggregate number of recipients, total activities analyzed, total unique Internet location, median time to first activity, and geographic regions with activities. These statistics may be compared with those for a previous period.

Furthermore, the Report 400 may include an Encryption Feature Table 435, tabulating the percent of total messages of each type that are transmitted as encrypted, for instance noting the message type, e.g. certified e-delivery proof, electric signature, and/or file share. These statistics may be compared with those for a previous period.

If an email is sent and detected to be opened, the HTTP data can be captured by the system operating for the sender. The captured HTTP data includes at least the IP addresses where the email was opened or acted upon. Additionally, if the IP address detected in one opening is different from another open IP address detection, and they are either (i) measured within a short period of time, (ii) not associated with the same ISP, or (iii) not associated within the same geo-location, then the system may generate and transmit a report to the sender and/or sender administrator to alert them that the recipient's email account may have been hijacked, and that some of the opens detected at that recipient may not be opens performed by the sender's intended recipient.

In this case, an analyzer is configured to perform the following functions:

First, the analyzer parses the text content of the HTTP data record returned to the system server operating for the sender, Second, upon finding indicators in the HTTP data record text related to IP-address, identifies the geo location (e.g. country) associated with the IP addresses, and parsing text within a set parameter of characters after this text indicator from a list (for example, an IP address range) and storing the indication as to whether opening has been detected in different geographic IP locations within a parameter timeframe, Third, the analyzer determines whether the open detections can be relied upon by the system as opened by the sender's intended recipient or by a cybercriminal that is monitoring the recipient's email account.

Some recipients have email boxes that have inbound security systems ("Bot-Click") that automatically click and test links, for example to check for malware. If this is the case, a location could be returned that differs from location associated with the IP address that the recipient opened the email from. Accordingly, the analyzer may need to differentiate between three open detections, namely (1) the intended recipient open detection, (2) the Bot-Click open detection, and (3) the third-party eavesdropper open detection.

Furthermore, some recipients access the internet through an ISP that does not have a static link associated with the user. In this case, each new email open may display a different IP address within the IP range associated with the ISP; and if so, would show a different IP address for each open. In this case, the analyzer may need to ensure that opens by the same recipient at different IP addresses are not considered opens by third parties. This distinction can be based on the international detection of IP location (relative to the intended recipient home country).

Furthermore, some recipients forward emails legitimately to colleagues, which may trigger an open detection separate from the original intended recipient upon the colleagues opening of the email. Moreover, the colleagues may themselves have email boxes with inbound security systems ("Bot-Click") that automatically click and test links (for malware, etc.). If that is the case, the opening of the forwarded email by the colleague could return a location that differs from location associated with the IP address that the forward recipient opened the email from or other matching data such similar time frame and common locale, country, network and differing IP network address.

Ultimately, the goal of the technology is to determine if an unintended third party has opened or acted upon the recipient email, so that it can be reported to the sender and/or sender administrator. This can then be used as an indication to determine if a copy of the message was forwarded to a second system via an auto-forwarding rule or other IMAP/server connection to the original recipient email account, which is an indication of receiver email account hijacking.

Figure 5:
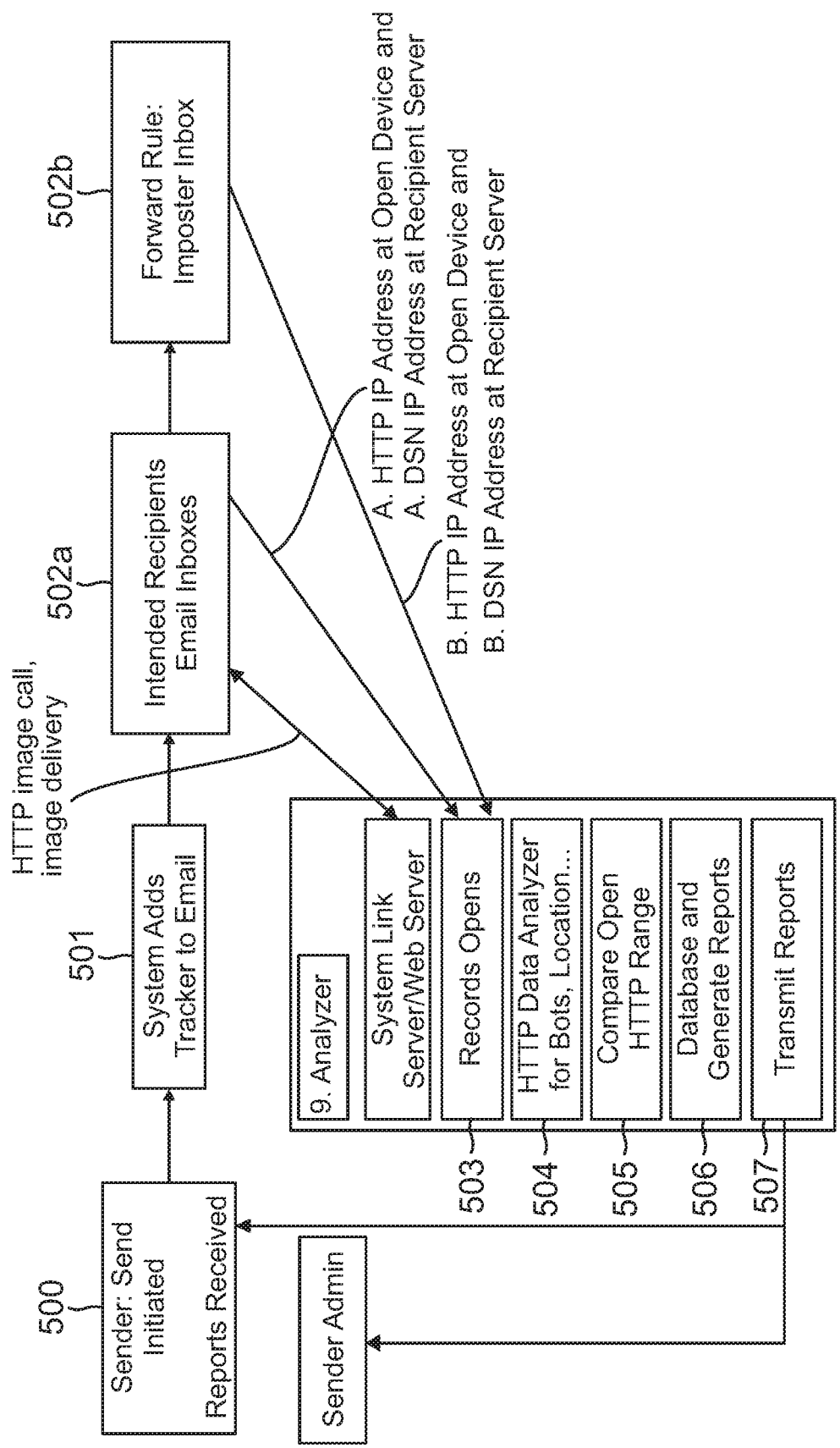
FIG. 5 is a flow chart illustrating an embodiment of the present disclosure, namely email account compromise detection via parsing HTTP data returned to the server at opening for IP address changes.

The steps of the system would be the technology described in application Ser. No. 17/663,425 Entitled, "IDENTIFYING HTTP REQUESTS GENERATED FROM LINKS EMBEDDED IN EMAILS BY AUTOMATED PROCESSES", hereby incorporated by reference herein in its entirety, and summarized here in more detail:

As shown in FIG. 5, in step 501, the system automatically adds the tracking link to the sender email. This can be accomplished by, at the click of the send button connecting via an API to the link tracking server to generate a unique link associated with the message and embed that link in the message before the message sends. Alternatively, the message could be directed to route outbound through a service that adjusts the message content by adding such tracking link.

In step 502*a*, the recipient—or according to step 502*b* any subsequent recipients to which the email is forwarded—receives and opens the email. This causes the tracking link server to record the opening.

In step 503, the tracking link server records HTTP data associated with each opening and builds a database related to all of the tracking details associated with each open detection for each sent message. The database may comprise the following information parsed from the HTTP open tracking data: (a) IP address of the connection with the device opening, (b) uniform timestamp of each opening (time of the tracking link server at the time of the open detection link extraction), (c) device identifiers of the device associated with each open detection, and (d) system configurable list of countries or geographies the sender believes its recipients do not associate with for the purpose of the sender's business ("High Risk Geographies").

In step 504, the Analyzer may use the system described in application Ser. No. 17/663,425 to determine whether the open detection was a Bot-Click, referring to the email being opened by a server rather than a human.

In step 505, the Analyzer compares the HTTP open data captured IP addresses at each opening with an IP address geolocation table or system and recording the geographic location and internet service provider associated with each open detection, including whether the open detection was through an IP address associated with a Virtual Private Network (VPN) provider or at a list of specific VPN providers, wherein the list may include sub lists such as free VPN providers most likely to be used by cybercriminals. The Analyzer may need to determine geo-location of IP addressed and associated VPN or ISPs by passing the IP address into a third-party IP analyzer that returns the location and ISP data for the IP address.

In step 506, the database is further compiled with the Analyzer's output of (a) open click geolocation, (b) whether the open click VPN was identified, (c) whether the open click VPN was on the VPN list, and if applicable, (d) whether the click was a Bot-Click or human click. The Analyzer begins to perform a comparative analysis for each message sent. This comparative analysis proceeds by the Analyzer comparing the geolocation for each determined HTTP open detection or human HTTP open detection associated with the message from the IP address of the device at the HTTP open detection.

If the geolocations of the opens are in different countries, the Analyzer records the geolocations and reports the open as "International Activity". If the geolocations of the human opens are in different countries, and one country is in the high-risk geography table, analyzer records the geolocations and reports the open as having "High Risk". If the geolocations of the human opens are with a VPN found in the VPN List Table, the Analyzer records the geolocation's and reports the open as having "Potential Risk".

Subsequently, for each message sent the Analyzer generates a report for the sender and/or sender administrator that indicates the risk factor associated with the recipient. The indicated risk factor can be at least one of the following, any combination thereof, or alternatively the highest applicable risk category: a) normal, (b) multiple, (c) international activity, (d) potential risk, or (e) high risk. Normal applies to cases where no international activity, and no high or potential risk is identified by the Analyzer. Multiple applies to cases where no international activity, and no high or potential risk is identified by the Analyzer, but at least one subsequent open detection IP address is different from any prior open detections, indicating either opens by multiple different humans, or the same human opening in multiple times with a dynamic IP address at the opening device.

In step 507, this report is then transmitted to at least one of the: (i) sender, (ii) sender administrator, and (iii) recipient. In a preferred embodiment, the report may in a known manner be rendered authenticatable, which improves its evidential value. Additionally or alternatively, the original message content and uniform timestamps of sending, delivery, and/or opening may be cryptographically associated with the report of the message.

The analyzer may be further configured to generate and transmit supplemental alerts if a message initially categorized as "normal" is subsequently flagged as (a) international activity, (b) potential risk, or (c) high risk.

Finally, if a given email has multiple recipients, the report outputs may be compiled in a table to readily identify the risk for each recipient of each sent email. This step may also be advantageous for a sent email that is of high value, sensitive in nature, encrypted, or otherwise falling under a designated classification of email.

In another embodiment, the Analyzer performs its functions on at least one of: (i) links embedded in documents, (ii) other methods of tracking where a rights-protected document or email attachment is opened, or (iii) where an HTML document or page is viewed, or (iv) a download link is clicked. This embodiment builds on the system described in USPTO patent application 63/363,014, hereby incorporated by reference herein in its entirety.

Figure 6:
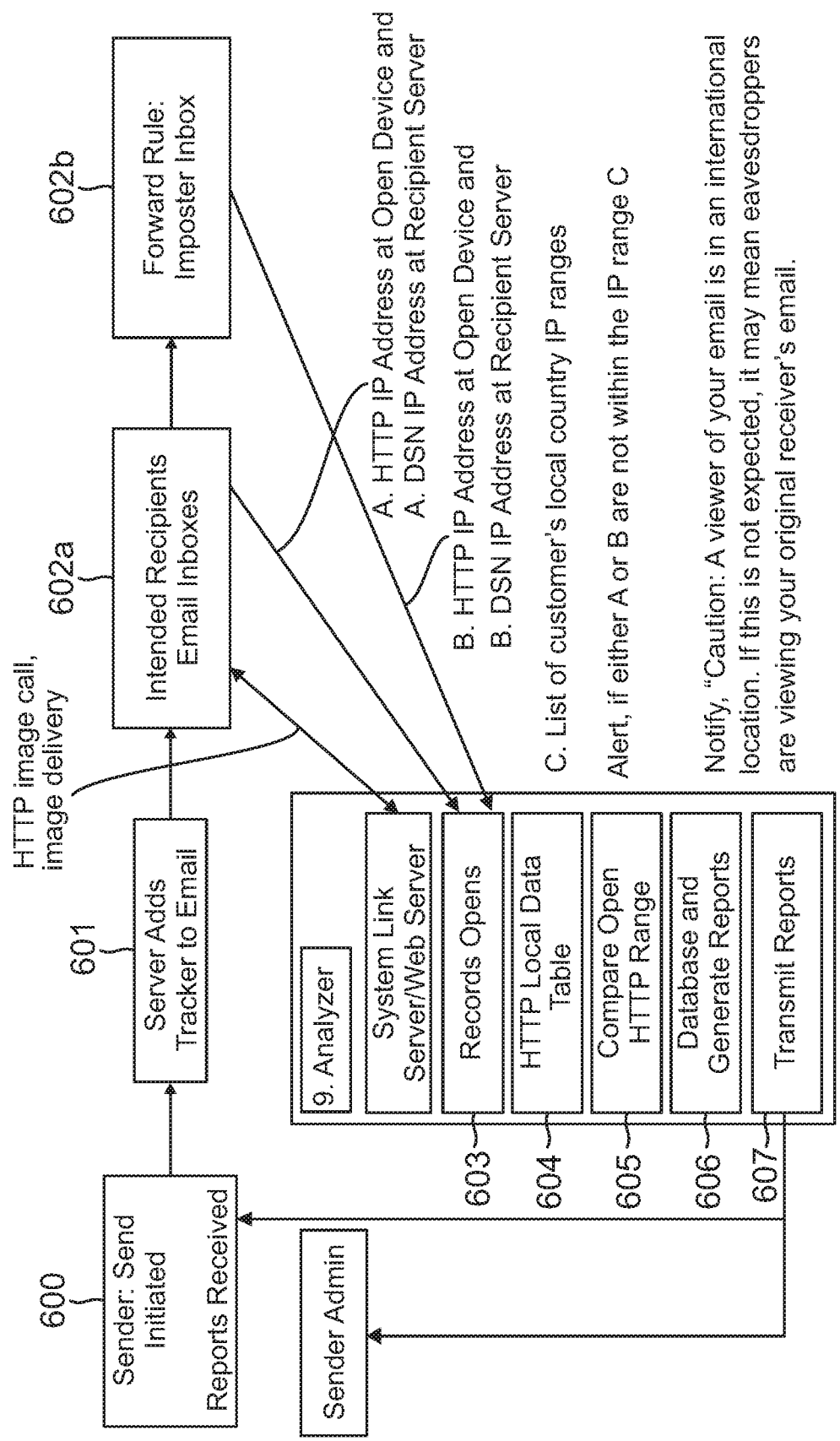
FIG. 6 illustrates one embodiment of a flow chart illustrating an embodiment of the present disclosure, namely the home country comparison.

Turning now to the embodiment shown in FIG. 6, the following steps are performed:

Step 601, the System adds the tracking link to the sender email.

Step 602, the recipient—or any subsequent recipients to which the email is forwarded—receives and opens the email. This causes the tracking link server to record the opening.

Step 603, the tracking link server records HTTP data associated with each opening and builds a database related to all of the tracking details associated with each open detection for each sent message.

Step 604, the Analyzer accesses a table of home country IP range.

Step 605, the Analyzer may additionally compare the HTTP open data captured IP addresses at each opening with an IP address geolocation table or system and recording the geographic location and internet service provider associated with each open detection, to identify if the open HTTP or DSN IP addresses are not within the home country IP range.

Step 606, the results of the Analyzer are added to the database and the Analyzer generates a report based on the results. For instance, the report notification could read: "Caution: A viewer of your email is in an international location. If this is not expected, it may mean eavesdroppers are viewing your original receiver's email."

In step 607, the Analyzer transmits the report to the sender and/or sender administrator.

Figure 7:
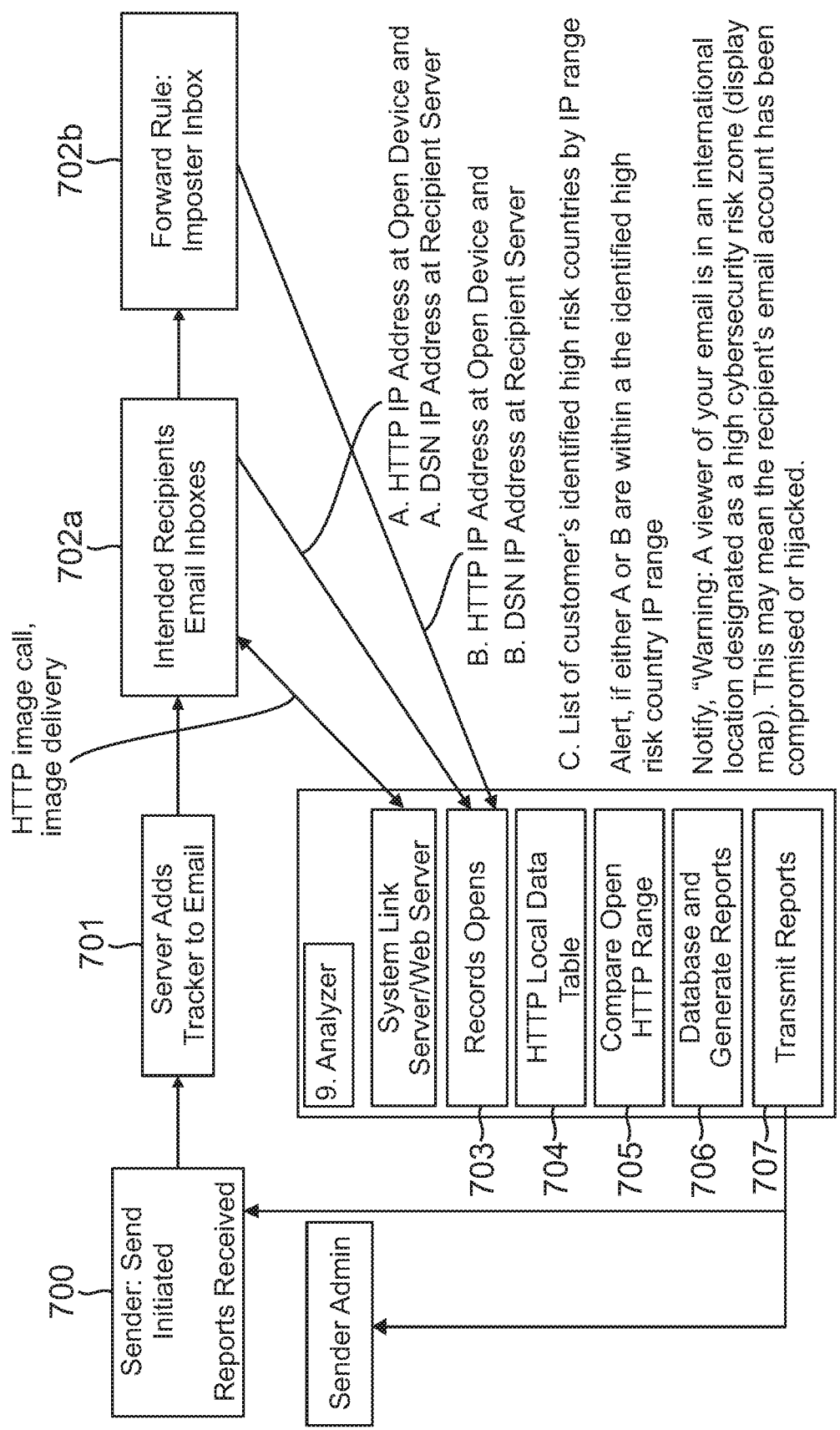
FIG. 7 illustrates one embodiment of a flow chart illustrating an embodiment of the present disclosure, namely the high-risk country.

Turning now to the embodiment shown in FIG. 7, the following steps are performed:

Step 701, the System adds the tracking link to the sender email.

Step 702, the recipient—or any subsequent recipients to which the email is forwarded—receives and opens the email. This causes the tracking link server to record the opening.

Step 703, the tracking link server records HTTP data associated with each opening and builds a database related to all the tracking details associated with each open detection for each sent message.

Step 704, the Analyzer accesses a table of senders determined high risk country IP ranges.

Step 705, the Analyzer additionally compares the HTTP open data captured IP addresses at each opening with an IP address geolocation table or system and recording the geographic location and internet service provider associated with each open detection, to identify if there is an open HTTP or DSN IP addresses that is in one of the high risk locations.

Step 706, the results of the Analyzer are added to the database and the Analyzer generates a report based on the results. For instance, the report notification could read: "Warning: A viewer of your email is in an international location designated as a high cybersecurity risk zone (display map). This may mean the recipient's email account has been compromised or hijacked."

Step 707, the Analyzer transmits the report to the sender and/or sender administrator.

As an additional embodiment, and a modification to the above embodiments, the sender's message header can be modified so that DSNs are routed to the server, and DSNs can be parsed for IP range at the recipient server, and the same international and high risk country-based IP range can be performed based on message delivery (forwarded message) to an unintended, high risk, or international country.

The reports generated by the described methods may be returned in a variety of manners, including via email or in a receipt. Alternatively, it may be appended to a receipt as a digitally signed PDF report having a receipt message ID. Alternatively, it may be transmitted as a windows tray or desktop alert. Yet another alternative is for the report to be dynamically updated in a web table or in an update view associated with the sent item. Regardless of the form in which the report is transmitted, it is advantageous for the report to be presented as a table including the following fields:

From the recipient address side, fields may include: Delivery Status, Details, Activity, Activity Details, and Times. "Delivery Status" may specify whether the item was (a) delivered to mail server, (b) delivered to mailbox, (c) delivered and opened, or (d) failed. "Details" may list the IP address for each opening.

"Activity" may specify whether the opening was categorized as (a) normal, (b) multiple, (c) international, (d) potential risk, or (e) high risk. These activity classifications correspond to the aforementioned security risk output of the Analyzer. "Activity Details" may provide additional context to supplement the "Activity" classification. For instance, if the activity is categorized as "Multiple", the activity details may list the number of times the email was uniquely opened (i.e. the number of unique IP addresses detected to have opened the mail). If the activity is categorized as "International", activity details may list the countries in which the email was opened. If the activity is categorized as "Potential Risk" the activity details may list the VPNs where opens were detected. If the activity is categorized as "High Risk", activity details may list or map images of high-risk countries where an open was detected. "Times" may specify the time of (a) sending, (b) delivery, (c) first opening, and (d) most recent open.

The report to the sender and/or the sender's administrator may include a report with recipient email address having fields for Activity and Activity Details. "Activity" may specify whether the opening was categorized as (a) International, (b) Potential Risk, or (c) High Risk. "Activity Details" may provide additional context to supplement the "Activity" classification. For instance, if the activity is categorized as "International", activity details may list the countries in which the email was opened. If the activity is categorized as "Potential Risk" the activity details may list the VPNs where opens were detected. If the activity is categorized as "High Risk", activity details may list or map images of high-risk countries where an open was detected. Furthermore, a configurable email alert may be generated based on the activity type.

The reports generated by the described methods may be returned in a variety of manners, including via email or in a receipt. Alternatively, it may be appended to a receipt as a digitally signed PDF report having a receipt message ID. Another alternative is for the report to be dynamically updated in a web table or in an update view associated with the sent item. Regardless of the form in which the report is transmitted, it is advantageous for the report to be presented as a table including the following fields:

FIGS. 8A and 8B describe the current simplified delivery method.

In step 800, Sender 810 composes and sends an email to at least one recipient.

In step 801, the email is sent to RMail 820 by App, SMTP or API.

In step 802, the email is received by RMail 820 and is prepared to be sent to the at least one Recipient 830 according to the feature selected.

In step 803, RMail 820 delivers the email to the recipient's mail server using one of the RMail features.

In step 804, RMail 820 gathers the delivery and open tracking information and provides the Sender 810 with a Registered Receipt email containing the delivery details with open tracking including the opening IP address if available In step 805, RMail 820 delivers to the Sender 810 an "Open Receipt" within 30-days of sending if: (a) The Registered Receipt does not have the status "Delivered and Opened" for that email address, or (b) The email is detected as opened.

FIG. 8B demonstrates a case where in addition to the intended recipient (IP 1) an eavesdropper (IP 2) opens the email. This case differs in that in the "Details" column of the delivery status table, two distinct IP addresses are listed, corresponding to that of the intended recipient (IP 1) and the eavesdropper (IP 2).

According to an aspect of the present invention, the system may be configured to generate specific outputs/alerts for additional open detections meeting certain threshold criteria.

In another aspect of the invention, a new setting titled "Advanced Open Detection" may be enabled. This setting may be located at the bottom of the setting section of the RPortal (which is a sender administration console for service settings), with access to this feature greyed out for users other than Super Admins. The setting may be controlled via a check box, wherein when in the default unchecked state, the system engages in the current open tracking behavior, whereas when checked continues open tracking is enabled.

A new setting titled "Advanced: Duration of Tracking Opens Per Tracked Message" may be added to RPortal. This setting may be located at the bottom of the RPortal Track and Prove setting section, wherein access to this feature is greyed out for users other than Super Admins, unless the Advanced Open Detection box described above is checked. The setting may be controlled via a drop-down menu, wherein the menu lists increments of time, for instance (i) 7 Days, (ii) 14 Days, (iii) 30 Days, and (iv) 60 Days. One time period may be designated as the default, for instance the "30 Days" setting.

A new setting titled "Open Detection Parameters" may be added as a new setting to RPortal. The setting may be located at the bottom of the RPortal Track and Prove setting section, wherein access to this feature is greyed out for users other than Super Admins, unless the Advanced Open Detection box is checked. The setting may be controlled via a drop-down menu, wherein the menu lists the following options: (i) "Report All Openings", and (ii) "Report Unique IP Openings Only", which may be designated as the default. The "Report All Openings" option may be configured to report all openings regardless of IP address, whereas the "Report Unique IP Openings Only" option may be configured to report only openings with unique IPs.

As shown in FIG. 9, there may also be a "Control Pick List", which includes home countries, high-risk countries, and high-risk VPN list. The Home Countries option will identify "international" activity as not being equal to the home country. The High Risk Countries option will flag high risk opens relating to high risk countries, which may differ based on the home country setting, since cybercriminals in certain countries are more likely to target users in certain countries, for example based on geopolitical factors. For example, for a user whose home country includes United States, default high risk countries may include Nigeria, Ukraine, Russia, and China. Users may adjust the classification of respective country to conform to their business/communication practices. For example, if a regular user regularly conducts business with Nigeria and therefore anticipates emails to regularly be opened in Nigeria, they may reclassify Nigeria from a high-risk "red" zone, to a lower risk classification such as "yellow" or "green". Conversely, if a user is regularly targeted by a country not typically associated with a high risk zone, they may choose to reclassify that country as a high-risk "red" zone to suit their situation.

In one embodiment, zone classifications may be customized based on at least one parameter other than country. For example, custom "green", "yellow", or "red" zones may be designated for given CIDR or IP ranges or for given networks. In another embodiment, zone classifications may be made for location parameters other than country, for example city or state. This may be particularly advantageous for users doing business with or otherwise communicating with people in high-risk countries, as it prevents false alerts from being triggered when communicating with their international contact, while nevertheless providing alerts for potential fraudulent activity originating from other cities or states within that country.

In another embodiment, pre-set policies may be included to provide special procedures for certain lists of countries. One exemplary pre-set policy is "Hot Zone Policy", which automatically classifies as "red" zones countries from which at an incident time have high rates of cybercriminal activity origination, such as Nigeria, Russia, China, North Korea, and Ukraine. Another exemplary pre-set policy is "Vacation Spot Policy" comprising common vacation destinations in a certain geographic region, for which "yellow" classifications may be automatically downgraded to "green" classifications. For instance, there may be a North and Central America list with countries such as Jamaica, The Bahamas, and Costa Rica, states such as Yucatan, Baja California Sur, and Quintana Roo in Mexico, and territories such as British Virgin Islands. Additionally, there may be a European list with common tourist destinations such as France, Netherlands, Italy, and the United Kingdom.

The High Risk VPN list may be a parameter utilized by the super admin to maintain the list.

There may additionally be a "Alert Pick List", which can set a threshold risk classification for triggering the sending of alerts via email to the email address of the RPortal Customer Admin in real time. For instance, the threshold may be set to (i) Yellow Alerts, or (ii) Red Alerts.

Furthermore, each risk classification level can have a designated alert email recipient list. For instance, emails having a "green" risk level may be sent only to the email sender, emails having a "yellow" risk level may additionally be sent to a designated IT professional, while emails having a "red" risk level may additionally be sent to the head IT professional or the entire IT department. This feature allows for a balance between reducing flooding of emails, while providing alert distribution to be proportional to the determined risk level, so that appropriate security precautions are taken.

When the Advanced Open Tracking function is enabled, the system's behavior is adapted in the following ways:

Registered Receipt Report

When sending an email, a Registered Receipt is transmitted from RMail to the sender. If an email was sent to multiple people and before the Registered Receipt is generated one recipient opens the email more than once from different IP addresses, the system will list each IP address in the "Details" section of the Delivery Status table. This can occur, for instance, if the recipient opens the email on a PC and on a mobile device. However, if the recipient opens the email more than once, but from the same IP address, the system will only list the IP address once. Thereby, the system is configured to distinguish between multiple email opens originating from the intended recipient, as opposed to multiple email opens attributed to the intended recipient in addition to an eavesdropper. Subsequently, the system is configured to output a registered receipt report reflecting this distinction.

Open Receipt Report

Depending on the Open Detection Parameter setting, an Open Receipt 1000 as illustrated in FIG. 10 may be generated each time an email is opened. An Open Receipt 1000 may include various items of information relevant for identifying risk severity. The Open Receipt 1000 may include an Open Detection IP Row 1010, listing the IP address from which the email was opened.

The Open Receipt 1000 may include a Security Level Row 1020, displaying a security level identifier based on the Analyzer's security assessment. A "Green" security assessment may be displayed for the first opening of an email and all subsequent openings within the same IP as the original opening or within the same home country list. A "Yellow" security assessment may be displayed for all openings outside the original opening IP address, for instance those identified as "International" or as "Potential Risk". A "Red" security assessment may be displayed for all openings outside the country of the original opening address deemed "High Risk" by the Analyzer. It is also advantageous to include a link to a knowledgeable article explaining the meaning and significance of the respective security level assessments.

The Open Receipt 1000 may additionally include an Open Detection Reporting Row 1030, providing a button to cancel open detection. In one embodiment, there is an option to "cancel open detection for this recipient", which can be provided with a link that, when clicked, disables open detection for the incident recipient and email. Open detection will continue, however, for other recipients of the email. There may be an option to "cancel open detection for this email", which can be provided with a link that, when clicked, disables open detection for the incident email.

It is advantageous for the aforementioned links to have a secondary process, so that the action is not recorded if the link is clicked by a bot-click or sandbox click.

Figure 11:
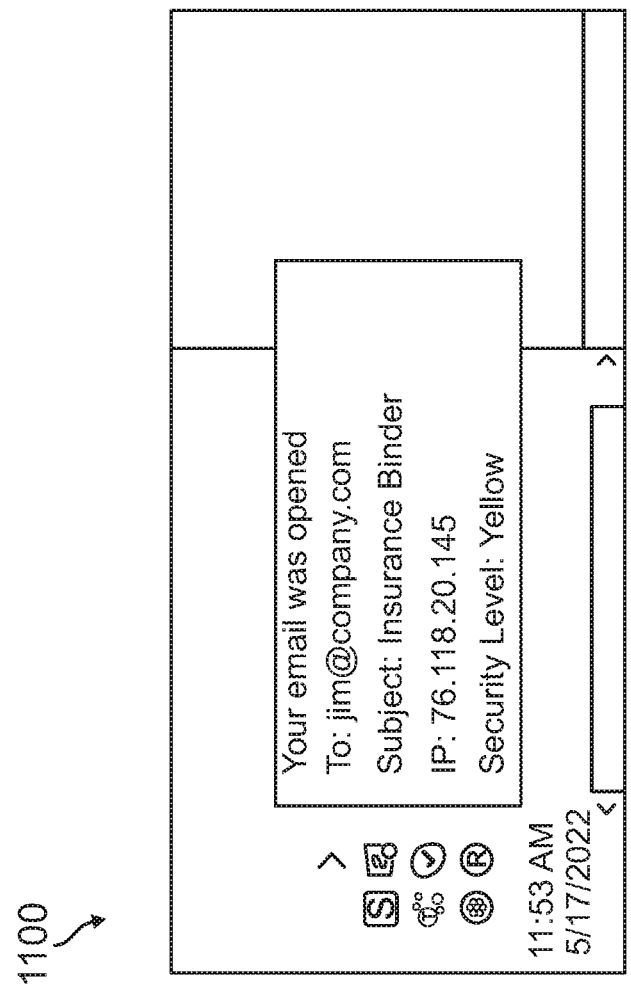
FIG. 11 is an exemplary desktop tray notification generated by the process illustrated in FIG. 1.

The reports generated and transmitted to the sender by the process shown in FIG. 1 may be in the form of a Desktop Tray Alert 1100 as shown in FIG. 11. Alternatively, it may be in the form of an SMS, or other text message alert. It is common for people to open emails on both a mobile device and a computer, each of which is identified by a unique IP address. In a usage report, open IPs must be accommodated in new columns. The usage reports may show the IP address and opening date and time for both the original opening as well as for any subsequent openings. Optionally, the usage reports may be updated and sent daily as scheduled reports. This information can be transmitted as text in an email body, tabulated in an HTML table, and/or as a CSV file. It is advantageous for this information to be added to future user reports. An exemplary desktop tray alert is shown in FIG. 11.

Figure 12:
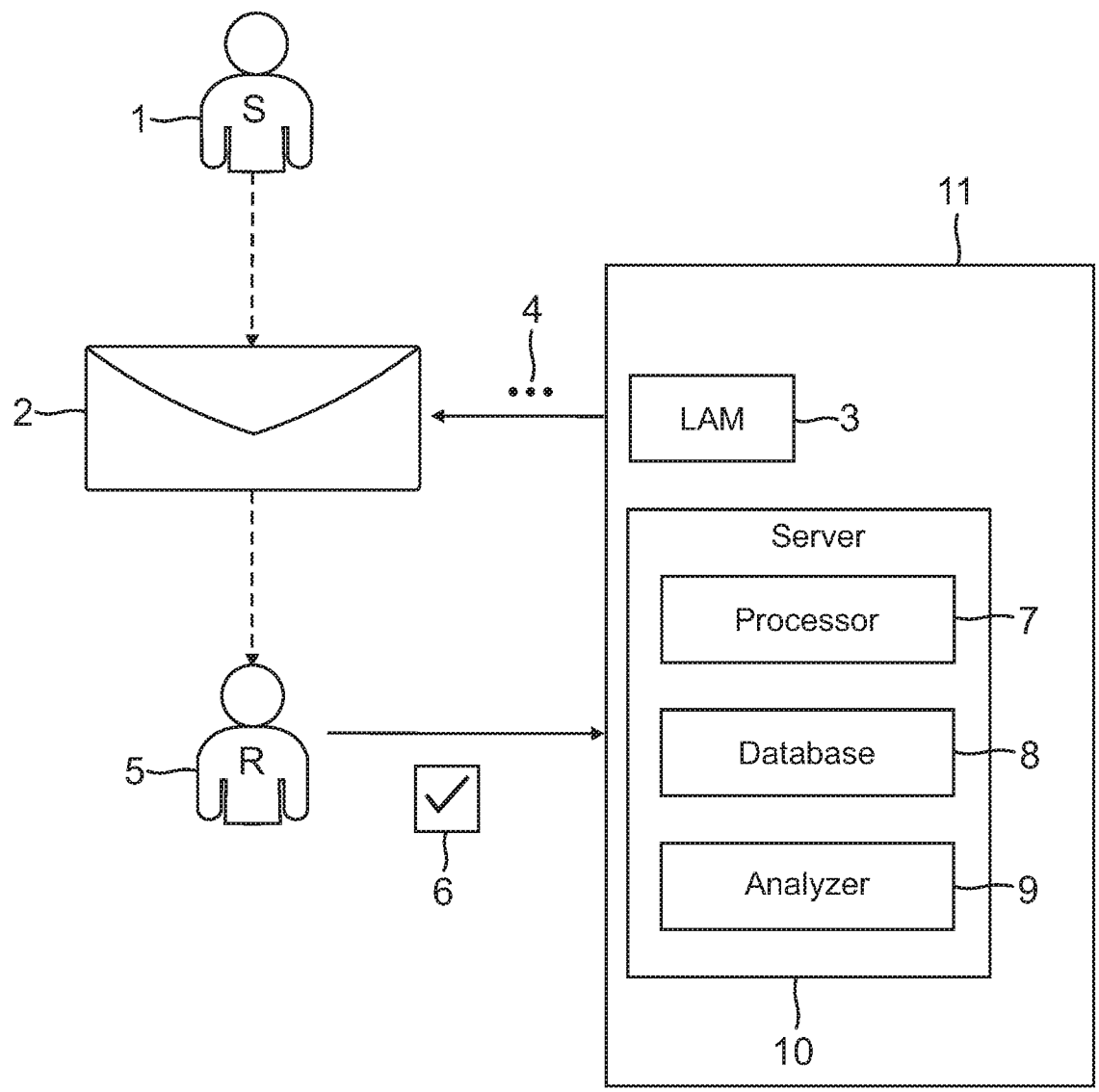
FIG. 12 is a block diagram illustrating the system and its functionality according to one embodiment of the present disclosure.

FIG. 12 illustrates a system and schematic diagram of the eavesdropping detection. The email sender 1 sends an email 2 to an intended recipient 5. Upon sending the email 2, the link adding module 3, which forms part of the system 11, adds at least one link 4 to the email. This link 4 may be configured to automatically extract data associated with an email open by the recipient 5. The recipient 5 opens the email 2, generating an HTTP request 6 that is transmitted to the web server 10. The web server 10 may comprise a processor 7, a database 8, and an analyzer 9. The system 11 may comprise the link adding module 3 and the web server 10. The processor may be programmed using hardware and/or software commands, and may be configured to receive and process HTTP requests 6 received when a recipient opens the email. The at least one database may be configured to include some pertinent information associated with email open, for instance IP ranges, location data, and/or any other parameters described herein. The analyzer may be configured to interface with the processor and the at least one database to perform an analysis and return an evaluation as to whether the HTTP request generated by the email open was initiated by the intended recipient, or by an eavesdropper for whom the email was not intended.

Figure 13:
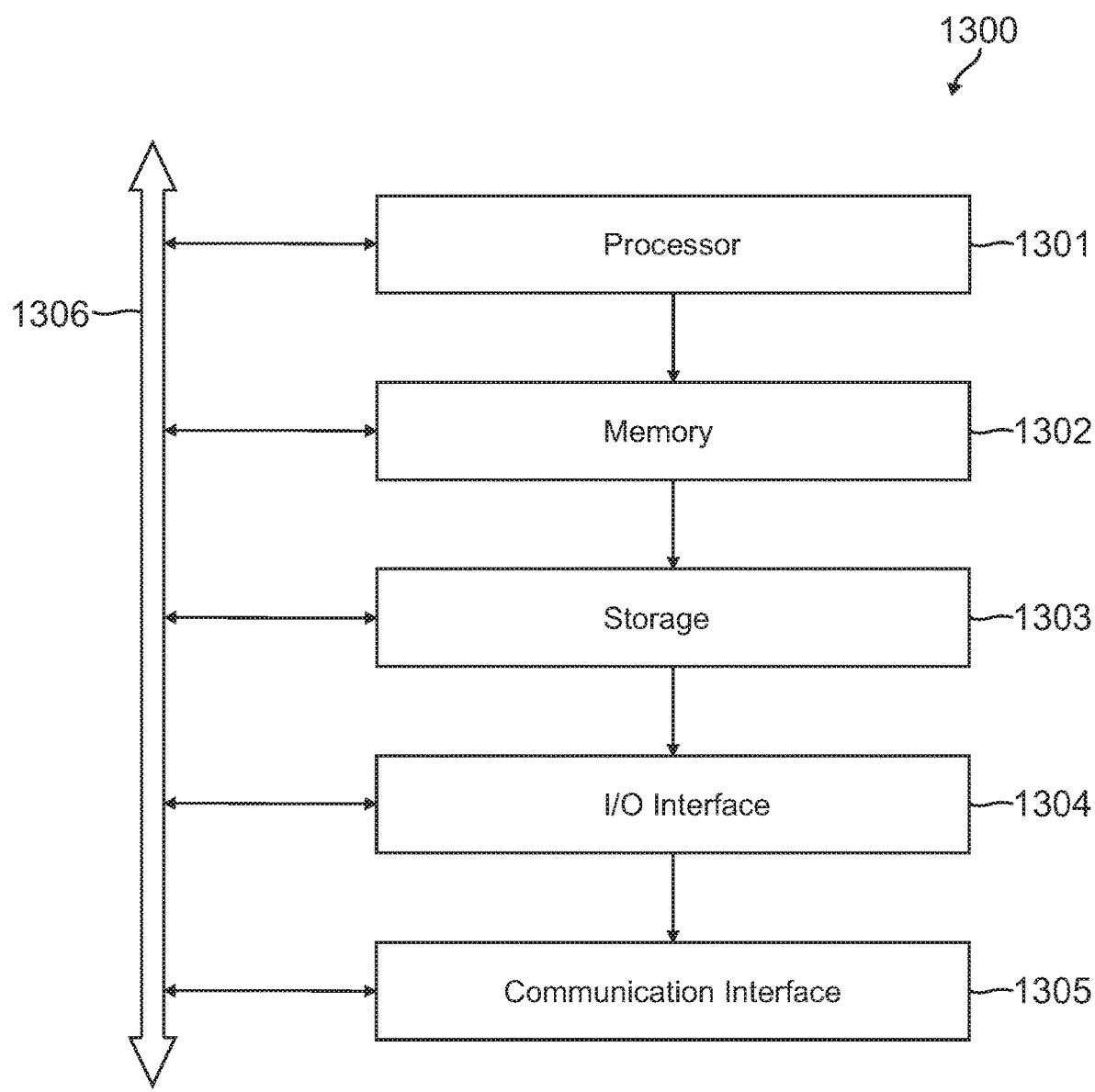
FIG. 13 is a schematic diagram of a computer or processing system that may be specifically modified by the various embodiments of the present disclosure.

FIG. 13 illustrates an exemplary computer system 1300 which may be used with some embodiments of the present invention, which may be, for example, a server or a client computer system. Computer system 1300 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 1300 may be a combination of multiple forms. Computer system 1300 may include one or more computer systems 1300, be unitary or distributed, span multiple locations, span multiple systems, or reside in a cloud (which may include one or more cloud components in one or more networks).

In one embodiment, computer system 1300 may include one or more processors 1301, memory 1302, storage 1303, an input/output (I/O) interface 1304, a communication interface 1305, and a bus 1306. Although this disclosure describes and illustrates a particular computer system having a particular number of particular components in a particular arrangement, this disclosure contemplates other forms of computer systems having any suitable number of components in any suitable arrangement.

In one embodiment, processor 1301 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 1301 may retrieve the instructions from an internal register, an internal cache, memory 1302 or storage 1303; decode and execute them; and then write one or more results to an internal register, an internal cache, memory 1302, or storage 1303. In one embodiment, processor 1301 may include one or more internal caches for data, instructions, or addresses. Memory 1303 may be random access memory (RAM), static RAM, dynamic RAM or any other suitable memory. Storage 1305 may be a hard drive, a floppy disk drive, flash memory, an optical disk, magnetic tape, or any other form of storage device that can store data (including instructions for execution by a processor).

In one embodiment, storage 1303 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 1303 maybe be internal or external to computer system 1300.

In one embodiment, input/output (I/O) interface 1304 includes hardware, software, or both for providing one or more interfaces for communication between computer system 1300 and one or more I/O devices. Computer system 1300 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 1305 includes hardware, software, or both providing one or more interfaces for communication between one or more computer systems or one or more networks. Communication interface 1305 may include a network interface controller (NIC) or a network adapter for communicating with an Ethernet or other wired-based network or a wireless NIC or wireless adapter for communications with a wireless network, such as a Wi-Fi network. In one embodiment, bus 1306 includes any hardware, software, or both, coupling components of a computer system 1300 to each other.

FIG. 14 is a graphical representation of an exemplary network 1400 that may be used to facilitate the various embodiments of the present invention. Server 1405 is operated by a services organization 1420, and typically includes at least one processor, input and output equipment or devices, memory, storage, and a communication interface. The server 1405 also operates under the control of specialized software programming commands that are designed to carry out the various processes described above. It should be understood that while the exemplary network 1400 is described in terms of a server 1405 operated by a services organization 1420, the server 1405 could be operated by a third party hired by the services organization or under the control of the services organization. The server 1405 could also be operated by a third party independent of the services organization, which then provides information and/or data to the services organization from which the services organization may provide services to a client 1425 of the services organization.

A data storage device 1410, which may be separate from the server 1405, but not necessarily, may be accessible to the server 1405, and may be used for storing date related to information and any other data related to operation of the various embodiments of the system and method described above. The data storage device 1410 may directly connected to the server 1405, or it may be accessible to the server 1405 through a network or the Internet 1415. The data storage device 1410 may also be a virtual storage device or memory located in the Cloud.

From the above, while it may be apparent that the various embodiments disclosed herein may be implemented by computers, servers or other processors that appear to be organized in a conventional distributed processing system architecture, the various embodiments disclosed herein are not conventional, because they bridge multiple remote information sources, such as legacy computer applications, legacy storage media and data resident on workstation storage, media, and also involve sophisticated analysis of various parts of an email message, as well as the methods, protocols, and communication pathways used to transmit and receive the email message. In fact, when the various embodiments of this disclosure are operated using computers, servers, and processors, those embodiments transform those computers, servers, and processors into specially programmed computer, servers, and processor in a way that improves not only the operation of the various hardware and software components of the system, but also significantly improve the transmission, receipt, and processing of email messages.

For the purposes of the invention, there are technologies known by those skilled in the art and the methods of implementing the invention will use technology components commonly used by those skilled in the art, and this description of the invention therefore does not describe these component technologies. These include use of:
1. Sender mail client
2. Sender mail server
3. Sender mail gateway
4. Secure transmission protocols
5. Recipient mail gateways
6. Recipient mail servers
7. Parts of a message
   a. Message headers
   b. Message content
8. Message transmission protocols including secure message transmission protocols
9. Data reports provided by email
10. Web views of data reports
11. Encryption and authentication processes and protocols
12. Use of software tools to extract content and create images of the content
13. Use of tools to create content that may be associated with HTML links, and self-extracting HTML links inserted into email
14. Associating information in databases
15. Operating software on web and email servers The term "email" used herein may refer to any electronic message type; the term "email protocol" may refer to any electronic data exchange protocol, and the term "electronic file" may refer to any file type.

While particular embodiments of the present disclosure have been described, it is understood that various different modifications of the scope and spirit of the disclosure are possible. The disclosure is limited only by the scope of the appended claims.

The following describes the invention and various preferred embodiment thereof:

Embodiment 1. A system 11 for determining if HTTP requests 6 generated by user interaction with an email is an activity of an intended recipient 5, wherein a link 4 is embedded in the email and configured to automatically extract, said system comprising:
   a link 4 adding module 3 configured to add at least one link 4 into an email 2 sent by a sender, wherein the link 4 is configured to automatically extract data associated with the link 4 when the email 2 is opened at a recipient 5; and
   a web server 10, including:
      a processor 7 programmed using hardware and/or software commands, wherein the processor 7 is configured to receive HTTP requests 6 at an internet address when a received email 2 is opened at the recipient 5, thereby automatically activating the link 4 that is configured to automatically extract data associated with the link 4;
      at least one database 8 comprising parameters related to email 2 opens, and
      an analyzer 9 configured to make a determination, based on said parameters, as to whether the data returned associated with the HTTP request 6 includes indicators that the HTTP request was not initiated by the intended recipient 5.

Embodiment 2. The system 11 of embodiment 1, wherein the analyzer 9 is further configured to determine if there is an additional HTTP request 6 record at a different location than a location that the sender 1 of the email 2 indicates is an expected location, and record the determination in a database 8 associated with the analyzer 9.

Embodiment 3. The system 11 of embodiment 1 or 2, wherein the analyzer 9 is further configured to determine if there is an additional HTTP request 6 record at a different country location from the declared home country or determined home country of the initial recipient, and record the determination in a database 8 associated with the analyzer 9.

Embodiment 4. The system 11 of one of the embodiments 1-3, wherein the analyzer 9 is further configured to determine if there is an additional HTTP request 6 record at a different country location from the home country of the sender and records the determination in a database 8 associated with the analyzer 9.

Embodiment 5. The system 11 of one of the embodiments 1-4, wherein the analyzer 9 is further configured to determine if there is an additional HTTP request 6 record at a country location that is in a list of countries as a parameter at the analyzer 9 and records the determination in a database 8 associated with the analyzer 9.

Embodiment 6. The system 11 of one of the embodiments 1-5, wherein the analyzer 9 is further configured to determine if there is an additional HTTP request 6 record at an ISP or VPN provider IP range that is in a list of ISP or VPN provider IP ranges as a parameter at the analyzer 9 and records the determination in a database 8 associated with the analyzer 9.

Embodiment 7. The system 11 of one of the embodiments 1-6, wherein the analyzer 9 is further configured to determine if there is an HTTP request 6 record that includes device information that is in a list of device information parameters at the analyzer 9 and records the determination in a database 8 associated with the analyzer 9.

Embodiment 8. The system 11 of one of the embodiments 1-7, wherein the result of the analyzer 9 is retained in a report 300.

Embodiment 9. The system 11 of embodiment 8, wherein the report 300 is returned to at least one of the sender 1 and an administrator associated with the sender 1.

Embodiment 10. The system 11 of embodiment 8 or 9, wherein the report 300 contains an aggregate of the records for an associated group of senders 1.

Embodiment 11. The system 11 of one of the embodiments 8-10, wherein the report 300 is rendered tamper-detectable.

Embodiment 12. The system 11 of one of the embodiments 8-11, wherein the report 300 contains a portion of the HTTP record 6.

Embodiment 13. The system 11 of one of the embodiments 1-12, wherein the at least one database 8 includes a database of IP address ranges for respective countries.

Embodiment 14. The system 11 of one of the embodiments 1-13, where the at least one database 8 includes a database of IP address ranges of high-risk Virtual Private Networks VPNs networks, mobile devices, and high-risk Content Delivery Networks CDNs.

Embodiment 15. A method for determining if HTTP requests generated by user interaction with links or with links configured to automatically extract in an email is an activity of an intended recipient of the email, said method comprising:
1) adding a tracking link 4 to a sent email 2;
2) recording an opening of the email 2 by one or more devices via a tracking link server 10;
3) extracting and parsing HTTP data associated with the openings of the email 2;
4) populating a database with the HTTP data, including at least the internet protocol IP address of the connection with the one or more devices opening the email 2;
5) analyzing geolocation data associated with the intended recipient 5 and the one or more devices opening the email 2; and
6) performing a comparative analysis assessing risk of email interception.

Embodiment 16. The method of embodiment 15, further comprising:
7) populating said database 8 with the IP address of the sender 1 that is parsed from the HTTP open tracking data; wherein the comparative analysis further comprises the steps of:
8) comparing whether the recipient country differs from the sender country or the sender's declared home or safe geolocations, based on IP addresses or sender declarations;
9) comparing where there are two openings associated with the same recipient email 2, and whether the openings occurred in different countries from one another; and
10) generating and transmitting a report 300 to the sender 1 and/or sender administrator, wherein the report 300 indicates a risk factor associated with each recipient 5 of the email, and wherein the risk factor is computed based on geolocation.

Embodiment 17. The method of embodiment 16, wherein the risk factor is further computed based on at least one of the following:
the type of device the email 2 was opened on;
whether a VPN was used; and
whether the click was human-generated or bot-generated.

Embodiment 18. The method of one of embodiments 15-17, wherein the HTTP open data captured IP address is compared to an IP address geolocation database 8.

Embodiment 19. The method of one of embodiments 15-18, further comprising the step of transmitting alerts 1100 upon given criteria being met.

Embodiment 20. An analyzer 9 that is configured to:
receive an HTTP request 6 that is associated with an email message ID of an email 2 opened at one or more devices opening the email 2;
extract and parse received HTTP data associated with the HTTP request 6;
populate a first database 8 with the HTTP data, including from the HTTP data the internet protocol (IP) address of the connection with the one or more devices opening the email 2 as a first information;
access a second database or a subsection of the first database 8, that contains at least one of geolocation or network owner data associated with the internet protocol (IP) address or other information in the HTTP data in the first information, which is a second information;
access a third database or an additional subsection of the first database 8 that contains at least one of IP addresses, IP address ranges, network owner, or device user agent data that is flagged with a risk level indicative of email 2 interception by at least one unauthorized third party, which is a third information;
compare at least a portion of the first information with at least a portion of the third information, or compare at least a portion of the second information with the at least a portion of the third information to determine if at least a portion of the first or the second information matches the at least portion of the third information; and if at least a portion of the first information or second information matches the at least portion of the third information, generate a report with a risk indication that indicates that the one or more devices opening the email 2 were not intended devices.

In the following, the reference numerals are listed:
1 sender
2 email
3 link adding module
4 link
5 recipient
6 HTTP request
7 processor
8 database
9 analyzer
10 server
11 system
300 email activity report
305 original recipient
310 activity classification
315 delivery status
320 location classification
325 time information
330 activity information
335 location and country information
340 network address information
345 network information
350 risk level information
355 email age information
360 transaction ID
365 transaction metadata
400 security report
405 highest risk level output
410 activities analyzed output
415 locations analyzed output
420 threat map
425 risk analysis table
430 sending statistics table
435 encryption feature table
810 sender
820 RMail
830 recipient
1000 open receipt
1010 open detection IP row
1020 security level row
1030 open detection reporting row
1100 desktop tray alert
1300 computer system
1301 processor
1302 memory
1303 storage
1304 I/O interface
1305 communication interface
1306 bus
1400 network
1405 server
1410 data storage device
1415 internet/network
1420 provider
1425 client

What is claimed is:

1. A system for determining if HTTP requests generated by user interaction with an email is an activity of an eavesdropper, said system comprising:
   a link adding module configured to add at least one link into an email sent by a sender to an intended recipient, wherein the link is configured to: automatically extract data associated with the link when the email is opened at a recipient, and generate an HTTP request including data associated with the link; and
   a web server, including:
      a processor programmed using hardware and/or software commands, wherein the processor is configured to receive the HTTP request and the data associated with the link;
      at least one database comprising at least one parameter related to email opens, wherein the at least one database correlates the at least one parameter with at least geolocation data; and
      an analyzer configured to make a determination, based on at least geolocation data, as to whether the HTTP request includes indicators that the HTTP request was initiated at an eavesdropper.

2. The system of claim 1, wherein the analyzer is further configured to determine if there is an additional HTTP request record at a different location than a location that the sender of the email indicates is an expected location, and record the determination in a database associated with the analyzer.

3. The system of claim 2, wherein the analyzer is further configured to determine if there is an additional HTTP request record at a different country location from the declared home country or determined home country of an initial recipient, and record the determination in a database associated with the analyzer.

4. The system of claim 2, wherein the analyzer is further configured to determine if there is an additional HTTP request record at a different country location from the home country of the sender and records the determination in a database associated with the analyzer.

5. The system of claim 2, wherein the analyzer is further configured to determine if there is an additional HTTP request record at a country location that is in a list of countries as a parameter at the analyzer and records the determination in a database associated with the analyzer.

6. The system of claim 2, wherein the analyzer is further configured to determine if there is an additional HTTP request record at an ISP or VPN provider IP range that is in a list of ISP or VPN provider IP ranges as a parameter at the analyzer and records the determination in a database associated with the analyzer.

7. The system of claim 2, wherein the analyzer is further configured to determine if there is an HTTP request record that includes device information that is in a list of device information parameters at the analyzer and records the determination in a database associated with the analyzer.

8. The system of claim 1, wherein the result of the analyzer is retained in a report.

9. The system of claim 8, wherein the report is returned to at least one of the sender and an administrator associated with the sender.

10. The system of claim 9, wherein the report contains an aggregate of the records for an associated group of senders.

11. The system of claim 8, wherein the report is rendered tamper-detectable.

12. The system of claim 8, wherein the report contains a portion of the HTTP record.

13. The system of claim 1, wherein the at least one database includes a database of IP address ranges for respective countries.

14. The system of claim 1, where the at least one database includes a database of IP address ranges of high-risk Virtual Private Networks (VPNs) networks, mobile devices, and high-risk Content Delivery Networks (CDNs).

15. A method for determining if HTTP requests generated by user interaction with links or with links configured to automatically extract in an email is an activity of an eavesdropper, said method comprising:
1) Adding a tracking link to a sent email;
2) Recording an opening of the email by one or more devices via a tracking link server;
3) Extracting and parsing HTTP data associated with the opening(s) of the email;
4) Populating a database with the HTTP data, including at least the internet protocol (IP) address of the connection with the one or more devices opening the email;
5) Analyzing geolocation data associated with an intended recipient and the one or more devices opening the email; and
6) Performing a comparative analysis assessing risk of email interception at an eavesdropper.

16. The method of claim 15, further comprising:
7) Populating said database with the IP address of the sender that is parsed from the HTTP open tracking data; wherein the comparative analysis further comprises the steps of:
8) Comparing whether the recipient country differs from the sender country or the sender's declared home or safe geolocations, based on IP addresses or sender declarations;
9) Comparing where there are two openings associated with the same recipient email, and whether the openings occurred in different countries from one another; and
10) Generating and transmitting a report to the sender and/or sender administrator, wherein the report includes a risk factor associated with each recipient of the email computed based on geolocation, said risk factor indicating a probability that a given recipient of the email is an eavesdropper.

17. The method of claim 16, wherein the risk factor is further computed based on at least one of the following: the type of device the email was opened on; and whether a VPN was used.

18. The method of claim 15, wherein the HTTP open data captured IP address is compared to an IP address geolocation database.

19. The method of claim 15, further comprising the step of transmitting alerts upon given criteria being met.

20. An analyzer that is configured to:
receive an HTTP request that is associated with an email message ID of an email opened at one or more devices opening the email;
extract and parse received HTTP data associated with the HTTP request;
populate a first database with the HTTP data, including the internet protocol (IP) address of the connection with the one or more devices opening the email as a first information;
access a second database or a subsection of the first database, that contains at least geolocation data associated with the internet protocol (IP) address, which is a second information;
access a third database or an additional subsection of the first database that contains at least one of IP addresses and IP address ranges, that is flagged with a risk level indicative of eavesdropping by at least one unauthorized third party, which is a third information;
compare at least a portion of the first information with at least a portion of the third information, or compare at least a portion of the second information with the at least a portion of the third information to determine if at least a portion of the first or the second information matches the at least portion of the third information; and
if at least a portion of the first information or second information matches at least a portion of the third information, generate a report with a risk indication that indicates that the one or more devices opening the email were eavesdropping devices.

* * * * *